US008185544B2

(12) United States Patent
Oztekin et al.

(10) Patent No.: US 8,185,544 B2
(45) Date of Patent: May 22, 2012

(54) GENERATING IMPROVED DOCUMENT CLASSIFICATION DATA USING HISTORICAL SEARCH RESULTS

(75) Inventors: Bilgehan Uygar Oztekin, Mountain View, CA (US); Pei-Wen Andy Chiu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 413 days.

(21) Appl. No.: 12/420,775

(22) Filed: Apr. 8, 2009

(65) Prior Publication Data

US 2010/0262615 A1 Oct. 14, 2010

(51) Int. Cl.
*G06F 17/30* (2006.01)
(52) U.S. Cl. ........ 707/768; 707/726; 707/740; 707/754; 706/12
(58) Field of Classification Search .................. 707/768, 707/754, 740, 726; 706/12
See application file for complete search history.

(56) References Cited

U.S. PATENT DOCUMENTS

| 2008/0120278 | A1* | 5/2008 | Roe et al. ......................... 707/3 |
| 2009/0077055 | A1* | 3/2009 | Dillon et al. ...................... 707/5 |
| 2009/0287658 | A1* | 11/2009 | Bennett ............................. 707/3 |
| 2010/0042583 | A1* | 2/2010 | Gervais et al. .................... 707/3 |
| 2010/0262615 | A1* | 10/2010 | Oztekin et al. ................ 707/768 |
| 2011/0082848 | A1* | 4/2011 | Goldentouch ................ 707/706 |
| 2011/0082860 | A1* | 4/2011 | Xing et al. ..................... 707/728 |
| 2011/0219295 | A1* | 9/2011 | Adams et al. ................. 715/234 |
| 2011/0264651 | A1* | 10/2011 | Selvaraj et al. ............... 707/723 |

OTHER PUBLICATIONS

Search Report and Written Opinion for PCT/US2010/030279 dated Jul. 15, 2010.
Castillo, C., et al., "Query-Log Mining for Detecting Polysemy and Spam," WebKDD 2008: Workshop on Web Mining and Web Usage Analysis, Aug. 27, 2008, 14 pgs. http:// chato.cl/papers/ccdfg_2008_polysem_spam.pdf.

* cited by examiner

*Primary Examiner* — Jean M Corrielus
(74) *Attorney, Agent, or Firm* — Morgan, Lewis & Bockius LLP

(57) ABSTRACT

A server system accesses, respectively, historical query information for queries that have search results corresponding to first information items and second information items and classification data of the first information items. Initially, the first information items are classified and the second information items are unclassified. Based on the classification data of the first information items and the historical query information, the server system generates classification data for the second information items and stores the generated classification data therein. In response to requests for service from client devices, the server system provides customized services to the client devices using the second information items and the corresponding classification data generated for the second information items.

36 Claims, 14 Drawing Sheets

GENERATING IMPROVED DOCUMENT CLASSIFICATION DATA USING HISTORICAL SEARCH RESULTS

TECHNICAL FIELD

The disclosed embodiments relate generally to online services offered on a client-server environment and, in particular, systems and methods for classifying information and providing customized online services using the classified information.

BACKGROUND

With the help of a search engine like Google, the Internet has become a major venue for people to receive information. But finding and serving information best matching a particular individual's needs and search interests has been an ongoing challenge for a search engine. First, different individuals have quite different preferences for information and it is not easy to accurately identify an individual's search interests. This issue is further complicated by the fact that a person's interests are often dynamic and vary over time. Second, many web pages on the Internet are either unclassified or misclassified. Without the classification data necessary for profiling the information provided by web pages, a search engine's quality of service may be adversely affected for including less relevant web pages in the search results while missing more relevant ones.

SUMMARY

In some embodiments, at a server system that is remote from a client device, the server system accesses, respectively, historical query information for queries that have search results corresponding to first information items and second information items and classification data of the first information items. Initially, the first information items are classified and the second information items are unclassified. Based on the classification data of the first information items and the historical query information, the server system generates classification data for the second information items and stores the generated classification data therein. In response to requests for service from client devices, the server system provides customized services to the client devices using the second information items and the corresponding classification data generated for the second information items.

In some embodiments, a server system remote from a client device comprises one or more processors, memory, and one or more programs. The programs are stored in the memory and configured to be executed by the processors. The programs include instructions for respectively accessing historical query information for queries having search results that correspond to first information items and second information items and classification data of the first information items. The first information items are initially classified and the second information items are initially unclassified. The programs also include instructions for generating classification data for the second information items based on the classification data of the first information items and the historical query information; instructions for storing the generated classification data in the server system; and instructions for providing customized services associated with the second information items to a plurality of client devices using the corresponding classification data stored in the server system.

In some embodiments, a computer readable storage medium having stored therein instructions, which when executed by one or more processors of a server system, cause the server system to access, respectively, historical query information for queries having search results that correspond to first information items and second information items and classification data of the first information items. The first information items are initially classified and the second information items are initially unclassified. The instructions, when executed by the one or more processors of the server system, also cause the server system to generate classification data for the second information items based on the classification data of the first information items and the historical query information, store the generated classification data in the server system, and provide customized services associated with the second information items to a plurality of client devices using the corresponding classification data stored in the server system.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
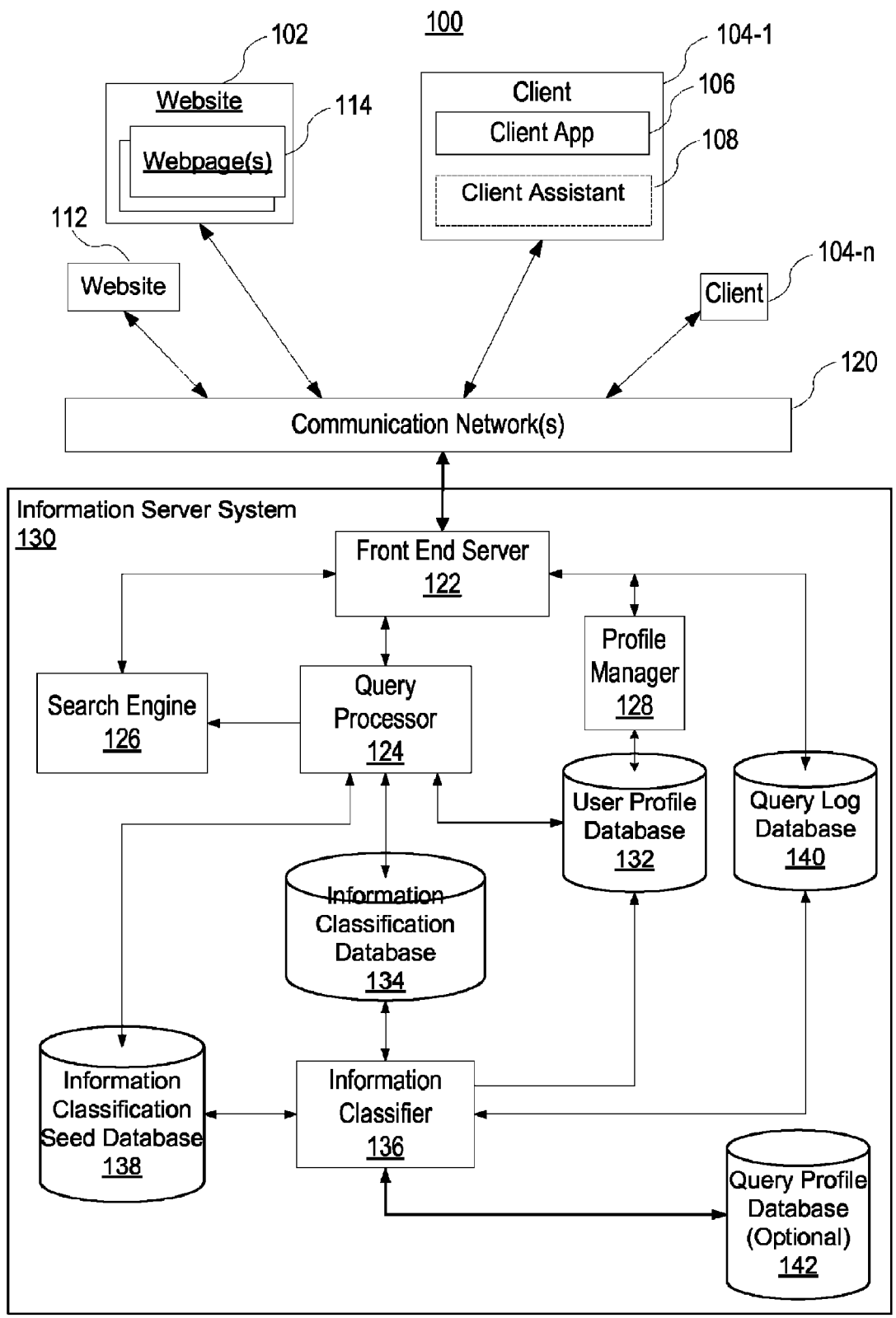
FIG. 1 is a block diagram of a distributed client-server computing system including an information server system according to some embodiments of the invention.

FIG. 1 is a block diagram of a distributed client-server computing system 100 including an information server system 130 according to some embodiments of the invention. The information server system 130 is connected to a plurality of clients 104 and websites 102 through one or more communication networks 120.

A website 102 may include a collection of web pages 114 associated with a domain name on the Internet. Each website (or web page) has a content location identifier, for example a universal resource locator (URL), which uniquely identifies the location of the website on the Internet.

The client 104 (sometimes called a "client system," or "client device" or "client computer") may be any computer or similar device through which a user of the client 104 can submit service requests to and receive search results or other services from the information server system 130. Examples include, without limitation, desktop computers, laptop computers, tablet computers, mobile devices such as mobile phones, personal digital assistants, set-top boxes, or any combination of the above. A respective client 104 may contain at least one client application 106 for submitting requests to the information server system 130. For example, the client application 106 can be a web browser or other type of application that permits a user to search for, browse, and/or use information (e.g., web pages and web services) at the website 102. In some embodiments, the client 104 includes one or more client assistants 108. The client assistant 108 can be a software application that performs one or more tasks related to assisting a user's activities with respect to the client application 106 and/or other applications. For example, the client assistant 108 may assist a user at the client 104 with browsing information (e.g., files) hosted by a website 102, processing information (e.g., search results) received from the information server system 130, and monitoring the user's activities on the search results. In some embodiments the client assistant 108 is embedded in one or more web pages (e.g., a search results web page) or other documents downloaded from the information server system 130. In some embodiments, the client assistant 108 is a part of the client application 106 (e.g., a plug-in of a web browser).

The communication network(s) 120 can be any wired or wireless local area network (LAN) and/or wide area network (WAN), such as an intranet, an extranet, the Internet, or a combination of such networks. In some embodiments, the communication network 120 uses the HyperText Transport Protocol (HTTP) and the Transmission Control Protocol/Internet Protocol (TCP/IP) to transport information between different networks. The HTTP permits client devices to access various information items available on the Internet via the communication network 120. The various embodiments of the invention, however, are not limited to the use of any particular protocol. The term "information item" as used throughout this specification refers to any piece of information or service that is accessible via a content location identifier (e.g., a URL) and can be, for example, a web page, a website including multiple web pages, a document (e.g., a picture, image, drawing, book, XML document, word processing document, spreadsheet document, presentation document, or any other document that may be indexed and available for searching using a search engine), a video/audio stream, a database or database record, a computational object, a search engine, or other online information service.

In some embodiments, the information server system 130 includes a front end server 122, a query processor 124, a search engine 126, a profile manager 128, an information classifier 136, a query log database 140, a user profile database 132, an information classification seed database 138, and an information classification database 134. In some embodiments, the information server system 130 also includes a query profile database 142, while in some other embodiments this database 142 is not needed because query profiles are not retained after they are used to "spread" classification information across the search results of the corresponding queries. The information server system 130 receives queries from clients 104, processes the queries to produce search results, and returns the search results to the requesting clients 104. The search results for a respective query (sent by a requesting client 104, or a respective requester at a client 104) are further processed based at least in part on the information classification data from the information classification database 134 and a user profile of the query requester obtained from the user profile database 132 to produce an ordered set of search results to be returned to the requesting client 104.

The front end server 122 is configured to receive a query from a client 104. The query is processed by the search engine 126 and the query processor 124 to produce a set of search results. The query processor 124 is configured to use the classification data stored in the information classification database 134 and user profile information stored in the user profile database 132 to determine the order of the search results for display. Optionally, the query processor 124 is implemented as part of the search engine 126; alternately, the query processor 124 is implemented as a separate server or set of servers.

After receiving the search results from the information server system 130, the client 104 displays the search results to a user. In some embodiments, the client assistant 108 monitors the user's activities on the search results and generates corresponding search results usage data. The search results usage data may include one or more of the following: user selection(s) of one or more search results (also known as "click data"), selection duration (amount of time between user selection of a URL link in the search results and user exiting from the search results document or selecting another URL link in the search results), and pointer activity with respect to the search results. In some embodiments, the search results usage data is sent to the information server system 130 and stored, along with impression data, in the query log database 140 to update the user profile database 132 and the information classification database 134. Impression data for a historical search query typically includes one or more scores, such as an information retrieval score, for each listed search result, and position data indicating the order of the search results for the search query, or equivalently, the position of each search in the set of search results for the search query.

The query log database 140 stores historical query information including, for a respective query, the query terms of the query (206, FIG. 2A), search results (210-1, FIG. 2A), impression data (e.g., one or more information retrieval (IR) scores of the search results, and position data of the search results (indicating the order of the displayed search results), and click data of the search results (user selections of the search results). In some embodiments, the historical query information stored in the query log database 140 for a respective query also includes user navigation statistical data for the search results. Optionally, the historical query information for a respective query further includes other information, such as location information (e.g., city, state, country or region) for the search requester and the language of the query. The queries for which information is stored in the query log database 140 are queries from a community of users, such as all users of the corresponding search engine 126. In some embodiments, the system includes multiple query log databases, or the query log database 140 is partitioned, with each query log database or partition storing records corresponding to queries received from a respective community of users, such as all users submitting queries in a particular language (e.g., English, Japanese, Chinese, French, German, etc.), all users submitting queries from a particular country or other jurisdiction or from a certain range of IP addresses, any suitable combination of such criteria.

The user profile database 132 stores a plurality of user profiles, each user profile corresponding to a respective user. In some embodiments, a user profile includes multiple sub-profiles, each classifying a respective aspect of the user in accordance with predefined criteria. In some embodiments, a user profile corresponds to a group of users (e.g., users sharing a particular client 104, or all the users who access the search engine from a particular website or web page). The user profile database 132 is accessible to at least the query processor 124 and the profile manager 128. The profile manager 128 creates and maintains at least some user profiles for users of the information server system 130. As described in more detail below, the profile manager 128 uses the user's search history stored in the query log database 140 to determine a user's search interests.

The information classification database 134 stores classification data of various information items on the Internet and is accessible to at least the query processor 124 and the information classifier 136. As will be discussed below in conjunction with FIG. 5A, the information classifier 136 is configured to classify or categorize the information items and store the classification data in the information classification database 134. In some embodiments, the information classifier 136 generates classification data for those not-yet-classified information items using the historical query information (e.g., impression data and results usage data) stored in the query log database 140 and the classification seed data of some classified information items stored in the information classification seed database 138.

The information classifier 136 relies on the historical query information in the query log database 140 to build and maintain the information classification database 134. As will be described below with reference to FIG. 3C, the information classifier 136 is also configured to generate user profiles information using the historical query information and the classification data in the information classification database 134.

Figure 2A:
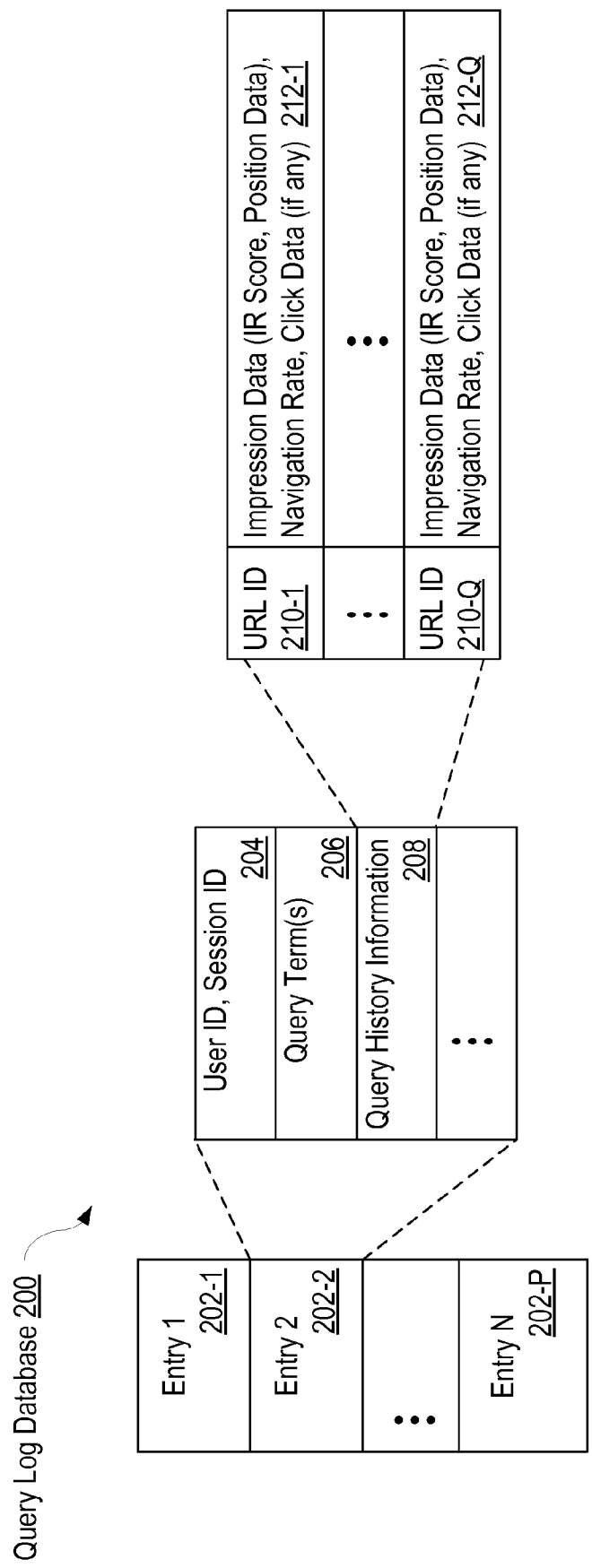
FIG. 2A is a block diagram of a data structure used by a query log database to store historical query information for a set of users in accordance with some embodiments.

FIG. 2A illustrates a data structure 200 for storing historical query information concerning a set of users in accordance with some embodiments. The data structure 200 includes a plurality of query records 202-1-202-N, each corresponding to a query submitted by a respective user at a respective time from a respective location for which the information server system 130 maintains the query-related information. In some embodiments, a query record 202 may include one or more of the following: user ID (identifying the user who submitted the query corresponding to the record 202) and session ID 204; query terms 206 of the query; and query history information 208 that includes a plurality of URL IDs (e.g., 210-1 ... 210-Q) representing the search results for the query, and additional information (212-1 ... 212-Q) for the URL IDs in the search results. In some embodiments, the query record 202 for a respective query only stores information for the top Q (e.g., 40 or 50) search results, even though the query may generate a much larger number of search results.

In some embodiments, the additional information for a respective URL ID in the query history information includes impression data (e.g., the IR (information retrieval) score of the URL, which is a measure of the relevance of the URL to the query, and the position of the URL in the search results); the navigation rate of the URL (the ratio between the user selections of the URL and the user selections of all the URLs in the search results for the same query during a particular time period, such as the week or month preceding submission of the query); and click data indicating whether the URL has been selected by a user among all the URLs. Note that the navigation rate of a URL indicates its popularity with respect to the other URLs among users who have submitted the same query. Optionally, the additional information associated with a URL identifies information items that contain the URL, such as other web pages, images, videos, books, etc. In some embodiments, a query record 202 also includes the geographical and demographical information of a query like the country/region from which the query was submitted and the language of the query. For example, for the same set of query terms submitted from different countries or at different times, the search results may be different. As will be explained below, the information in the query log database can be used to generate accurate classification data for large numbers of URLs.

The user ID 204 is a unique identifier for identifying the user (sometimes, the client) that submits the query. In many embodiments, to protect privacy of the system's users, the user ID 204 uniquely identifies a user or client, but cannot be used to identify the user's name or other identifying information. The same applies to the user ID 244 of the user profile record 242 discussed below with respect to FIG. 2D. In some embodiments, a network communication session is established between the client 104 and the information server system 130 when the user first logs into the information server system or re-logs into the system after the previous session expires. In either case, a unique session ID 204 is created for the session and it becomes part of the query record 202. The query terms 206 may be those terms originally submitted by the user or canonicalized into a format adopted by the server system.

For each query, the information server system 130 identifies a set of search results corresponding to the query. A search result is typically comprised of a URL (or an IP address), a snippet of text from the web page identified by the URL, and other auxiliary items. The set of search results is ordered in accordance with their respective relevance to the query such that more relevant results are displayed before the less relevant ones. For example, a set of 45 search results is broken into five result pages if there is a limit to displaying no more than 10 results per page. The results displayed on the first result are deemed to be more relevant to the query than the results on the second page and are therefore displayed first. In some embodiments, a displayed search result page is also referred to as an impression of the search results. Within one result page or one impression of search results, the position at or near the top of the browser window is reserved for more relevant results because it usually receives more attention than the other spots in the window.

At the client 104, the client assistant 108 monitors the user's activities on the displayed search results such as the impressions visited by the user, the amount of time the user spends on different search results (e.g., by tracking the position of the user's cursor over the search results), and the URL links clicked by the user. This user interaction information and other data characterizing the usage of the search results is sent back to the information server system 130 and stored in the data structure 200 (in the query history information 208) along with the corresponding URL ID 210.

Figure 2B:
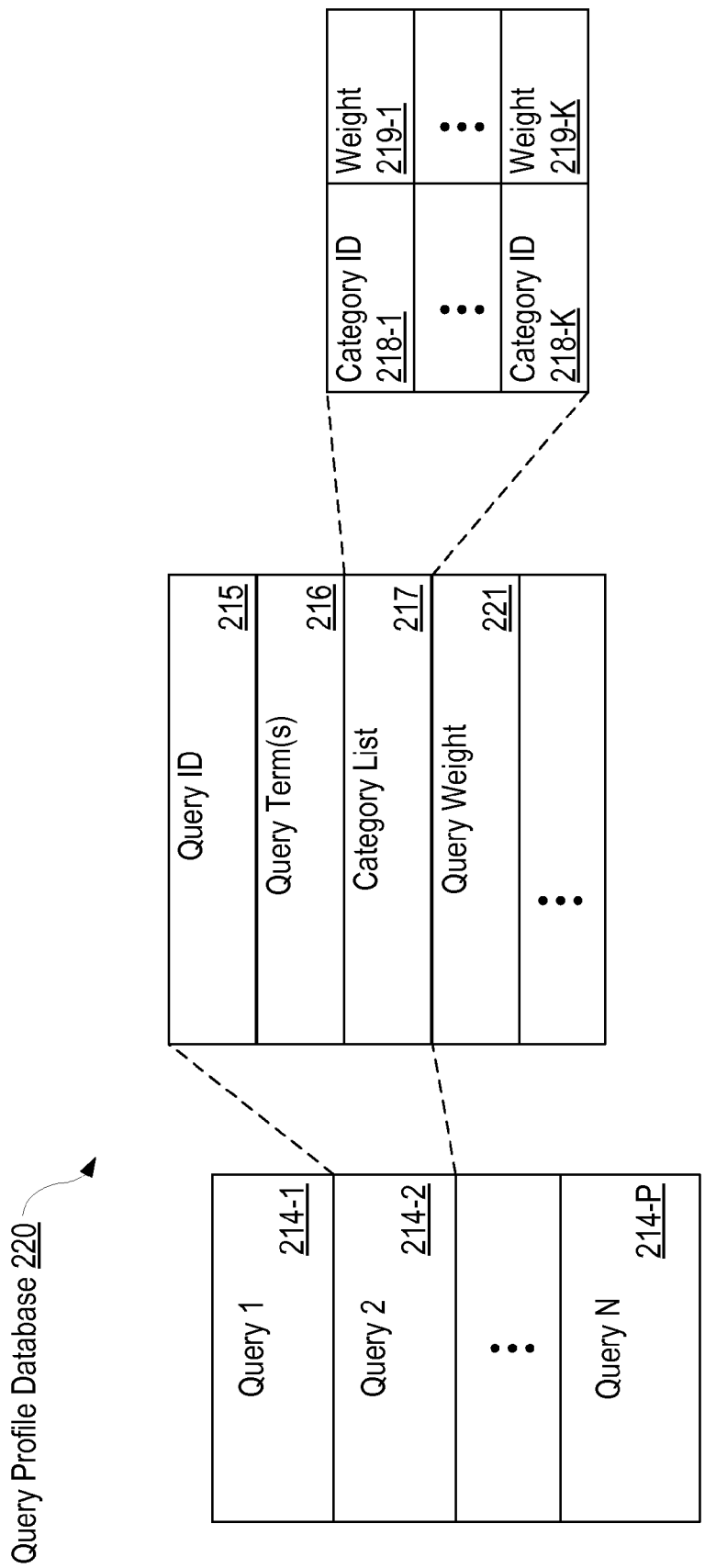
FIG. 2B is a block diagram of a data structure used by a query profile database to store information for a set of query profiles in accordance with some embodiments.

FIG. 2B depicts a block diagram of an exemplary data structure 220 for storing query profiles in accordance with some embodiments. Similar to the data structure 200 in FIG. 2A, the data structure 220 includes a plurality of query profile records 214-1 to 214-P, each of which corresponds to a user-submitted query. When the same query is submitted by many users, a single query profile 214 stores profile information for the query. In some embodiments, each query profile record 214 contains a query ID 215 that identifies a particular query, the set of corresponding query terms 216 in the query, and a category list 217 for classifying the query. Optionally, the query profile 214 may be assigned an overall query weight 221, which not only reflects the sum of the weights of the categories in the category list 217, but also one or more additional factors or metrics that indicate how reliably or how strongly the query profile is correlated with the profiles of the search results. This is discussed in more detail below.

In some embodiments, the category list 217 includes one or more pairs of (category ID 218, weight 219). The category ID 218 may correspond to a particular type of information such as news, sports, travel, finance, etc., and the weight 219 is a number that measures the relevance between the query and the corresponding type of information. For example, the query term "golf" may have relatively high weights for the categories of sports and sporting goods, but a low weight for the category of information technology (IT). In some embodiments, the category ID 218 corresponds to a "concept cluster," which may be produced by a clustering process for example, which may or may not be easily labeled with a category name. As will be further described below in connection with FIG. 3A, the information classifier 136 builds the query profiles from the historical query information in the query log database 140 and the classification data from the information classification seed database 138.

In some embodiments described below, individual query profiles 214 are generated, used and then disposed of without storing the query profiles in a database or other collective data structure 220.

Figure 2C:
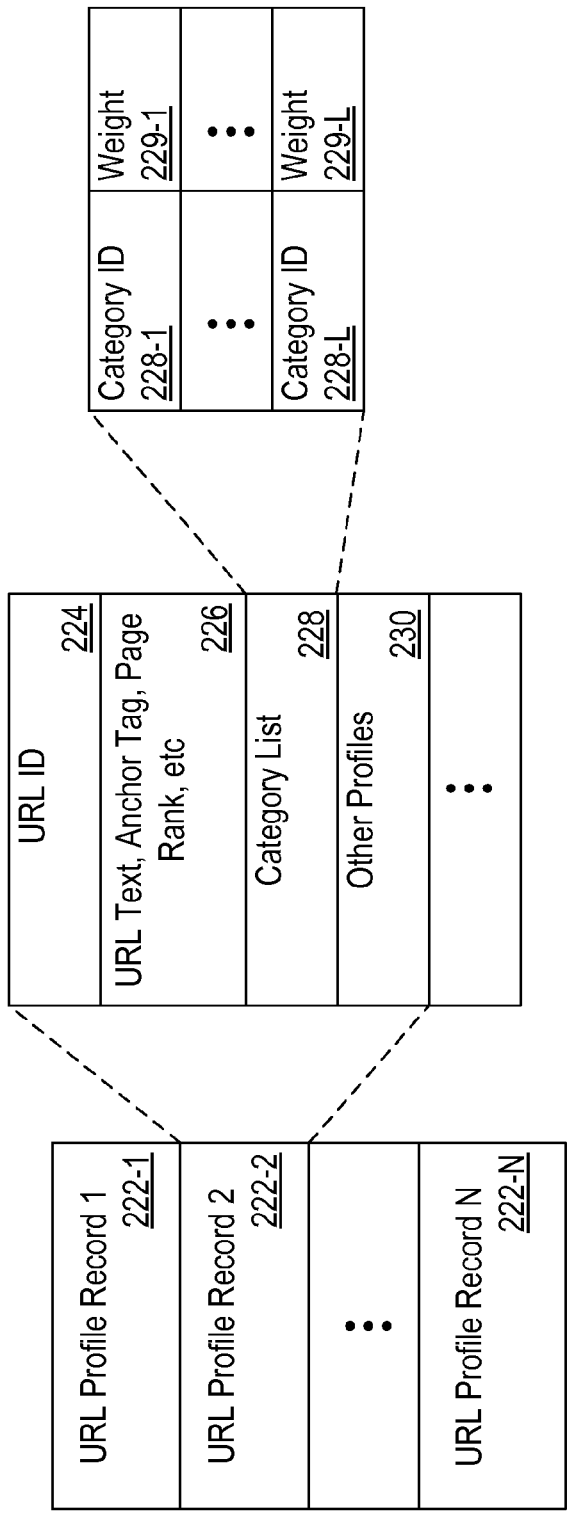
FIG. 2C is a block diagram of a data structure used by an information classification database and an information classification seed database to store information for a set of information items in accordance with some embodiments.

FIG. 2C is a block diagram of an exemplary data structure 240 for storing the classification data of a set of information items in accordance with some embodiments. One instance of this data structure 240 may be used to store classification data for the information classification seed database 138 and another instance of this data structure 240 may be used to store classification data for the information classification database 134.

The data structure 240 includes a plurality of classification data records 222-1 to 222-N (also herein called URL profile records or document profile records), each of which corresponds to an information item on the Internet (e.g., a web page or a website). In some embodiments, each classification data record 222 contains an information item locator such as a URL ID 224, one or more attributes (e.g., URL text, anchor tag, page rank, etc.), a category list 228 for classifying the information item, and optionally, other profiles 230 for classifying the information item. The category list 228 includes one or more pairs of (category ID 228, weight 229). As will be further described below in connection with FIG. 3B, the information classifier 136 generates the classification data for the information items using the historical query information from the query log database 140 and the query profile from the query profile database 142.

Figure 2D:
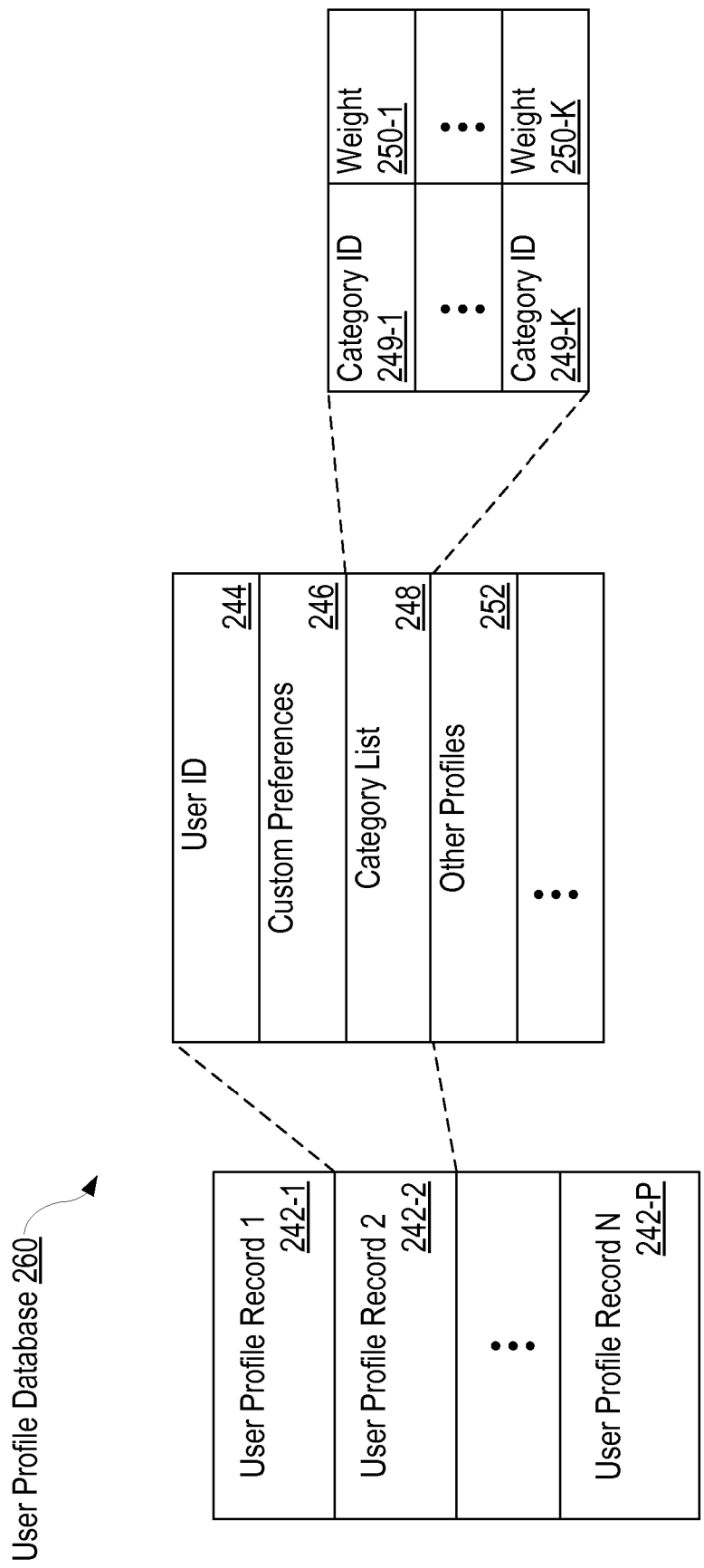
FIG. 2D is a block diagram of a data structure used by a user profile database to store information for a set of user profiles in accordance with some embodiments.

FIG. 2D is a block diagram of an exemplary data structure 260 for storing user profiles for a set of users in accordance with some embodiments. The data structure 260 includes a plurality of user profile records 242-1 to 242-P, each of which corresponds to a particular user (or group of users, as discussed above) of the information server system 130. In some embodiments, each user profile record 242 includes a user ID 244, and a category list 248 that includes one or more pairs of (category ID 249, weight 250) representing the user's search interests. Optionally, the user profile record 242 includes one or more custom preferences 246 (e.g., favorite topics, preferred ordering of search results), which may be manually specified by the user (e.g., using a web form configured for this purpose). In addition, the user profile record 242 may optionally include other types of user profiles that classify the user's search interest from different perspectives. These user profiles may be generated by the profile manager 128 to supplement or replace the category list 248 when needed.

Note that the category list of one web page or query or user may be different from that of another. For example, one web page may have a category of sports and a corresponding weight, while another web page may have nothing to do with sports and therefore may have a completely different set of categories in each category list. In some embodiments, the classification data of different web pages, queries and users are normalized such that, for the same category that appears in the category lists of different entities, their respective weights are comparable. Thus, when a first user's profile has a higher weight for a respective category than a second user's profile, this indicates a higher level of interest by the first user in the respective category than the second user.

Generally, it is possible for an information item such as a website or web page, or for a user to be classified by multiple profiles (230, 252) and/or category lists (228, 248). Different profiles and category lists may characterize the same subject from different angles and therefore have different uses. For simplicity and illustration, the embodiments of the invention assume that an information item corresponds to a web page that is uniquely identified by a URL. Throughout the specification, terms such as "classification data," "profile," "category list," "cluster" and the like are used interchangeably, each of which may be mathematically expressed as a sparse vector. Classification of a web page means generating a category list for the web page. But as noted in the background section, many web pages are either unclassified or misclassified. Therefore, one aspect of the invention is how to "spread" the classification data of classified web pages (e.g., the data stored in the information classification seed database 138) onto those unclassified web pages or websites to generate accurate classification data for the unclassified web pages or websites. Note that this process of spreading classification data does not require a priori knowledge of the content of the unclassified web pages and is therefore computationally efficient.

Figure 3A:
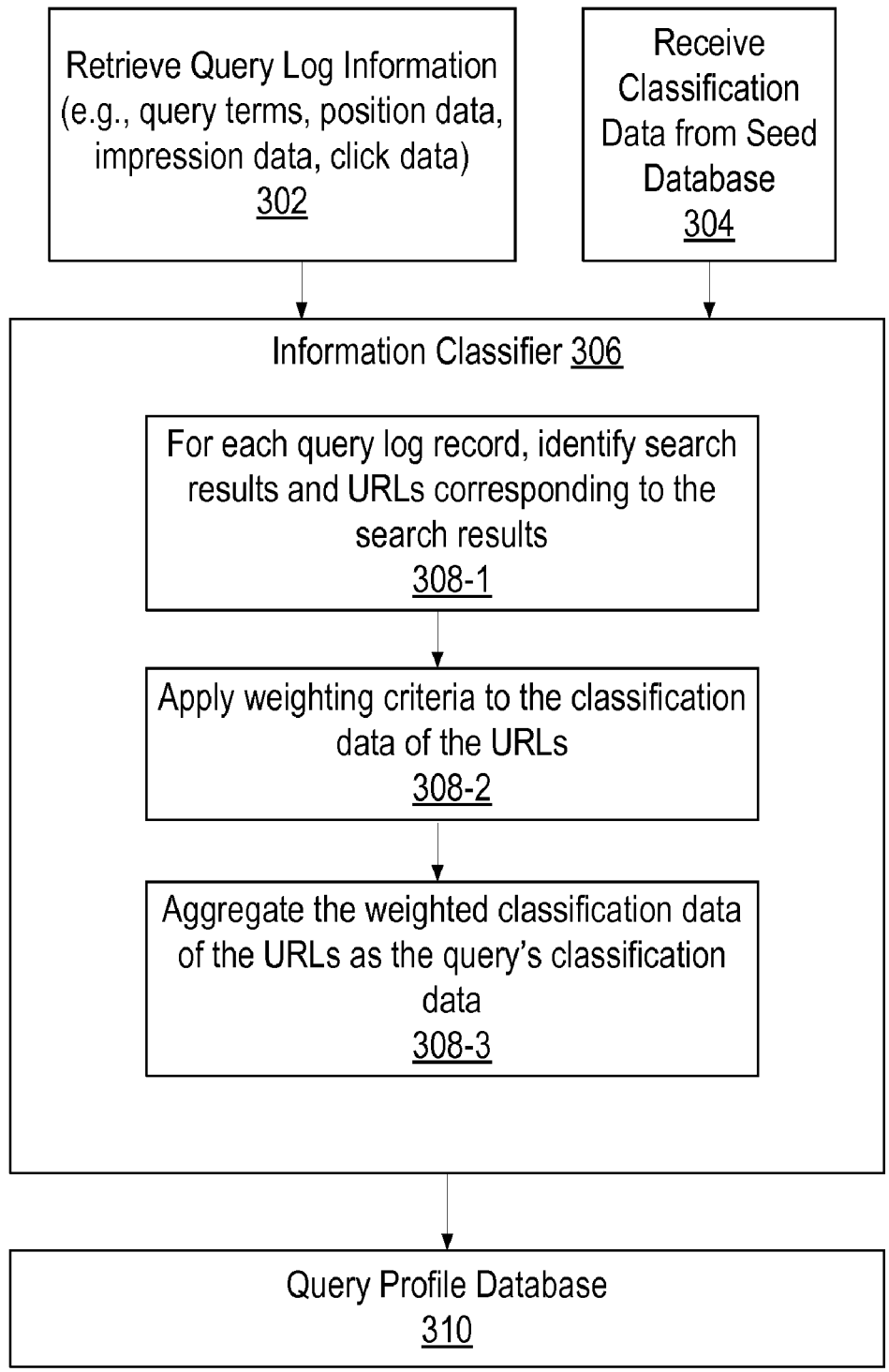
FIG. 3A is a flow diagram illustrating an exemplary process for building the query profile database in accordance with some embodiments.
Figure 3B:
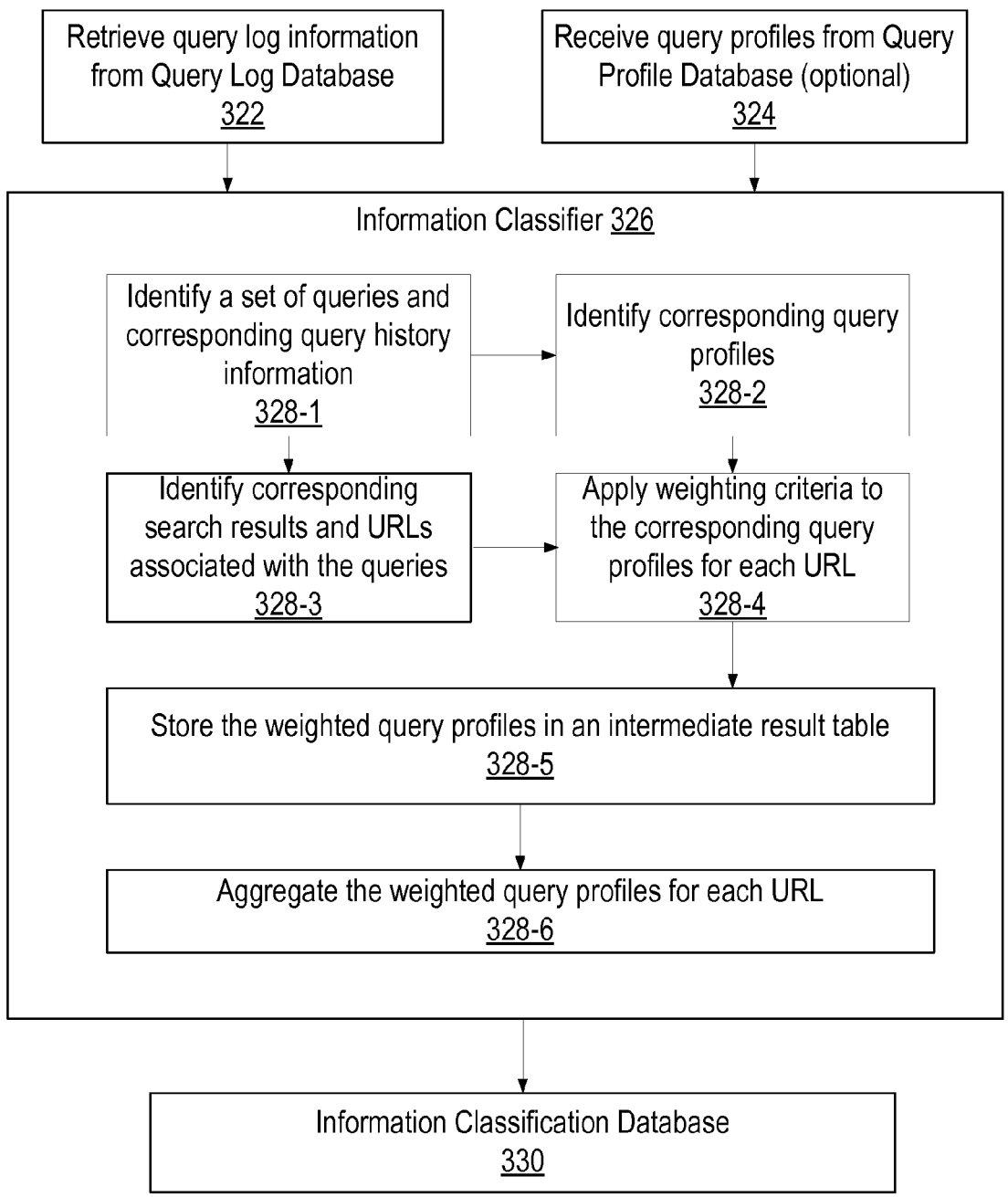
FIG. 3B is a flow diagram illustrating an exemplary process for building the information classification database in accordance with some embodiments.

In some embodiments, the process of spreading classification data from classified web pages to unclassified web pages involves two steps: (i) spreading the classification data from the classified web pages to queries that are related to both the classified and unclassified web pages; and (ii) spreading the classification data from the queries to the unclassified web pages. Note that the term "spreading" describes the process from the perspective of the classification data providers, i.e., the initially classified information items. But from the perspective of the classification data recipients, i.e., the initially unclassified information items, the process is a two-step aggregating operation: (i) aggregating the weighted contributions of classification data from different classified web pages to the same query as the query's classification data; and (ii) aggregating the weighted contributions of classification data from different queries to the same unclassified web page as the web page's classification data. FIGS. 3A and 3B are flow diagrams illustrating the two-step process in more detail.

In particular, FIG. 3A is a flow diagram illustrating an exemplary method 300 for building the query profile database 142 in accordance with some embodiments. The method uses the historical query information from the query log database 140 and the classification data from the seed database 138 to profile a set of queries submitted by a plurality of users during a period of time (e.g., the last six months). Each of the methods described herein may be governed by instructions that are stored in a computer readable storage medium and that are executed by one or more processors of one or more servers or clients. Furthermore, each of the operations shown in FIGS. 3A-3C may correspond to instructions stored in a computer memory or computer readable storage medium.

In some embodiments, the historical query information includes query terms, search results corresponding to the query terms, impression data (e.g., scores, position data) for the search results, and information tracking user interactions with the search results (such as click data). The classification seed data includes a plurality of sparse vectors, each of which provides clustering information of a particular web page (or web site). These sparse vectors are initial estimates of the web pages' relevance to various subjects, topics or concept clusters. Many approaches known in the art (e.g., analysis of a web page's content, key terms, and/or links) can be used to generate these sparse vectors. As initial estimates, these sparse vectors may not be perfectly accurate or complete. As will be described below, the two-step process of generating classification data can be an iterative process in some embodiments. An iterative spreading of the classification data can not only generate classification data for those unclassified web pages but can also update the classification data for previously classified web pages, including those initially classified web pages whose data has been used as seed data.

The historical query information from the query log database 140 that is used to generate classification data for a set of URLs corresponds to historical queries from a community of users. The community of users may be all users of the search engine associated with the query log database 140, or it may be a subset of all users of the search engine, such as users who submit queries in a particular language, users from a particular jurisdiction or geographic area, users who submit queries from a particular range of IP addresses, or any suitable combination of such criteria.

Using query log information retrieved (302) from the query log database 140 and the classification data retrieved (304) from the seed database 138 as input, the information classifier 136 generates (306) the query profiles for user-submitted queries. For illustration, this document describes embodiments in which the classification data in the seed database 138 is classification data for a plurality of URLs. However, in other embodiments the seed classification data is not limited to classification data for URLs. For example, the seed classification data in the database 138 may include classification data for websites (which could be called website-level classification data, in contrast to URL-level classification data).

As long as the seed classification data is reasonably accurate and there is a sufficient amount of query log data, the information classifier 136 can spread the seed classification data accurately and broadly to generate classification data for a large number of URLs that have not been accurately profiled by conventional approaches.

First, the information classifier 136 selects a query log record (having a set of query terms) in the query log database 140. For a respective query, the information classifier identifies (308-1) the search results and the URLs corresponding to the search results. If the same query appears in multiple query log records, representing different search requests from different users and at different times, there may be differences between the corresponding search results. In some embodiments, by grouping the search results together and analyzing the corresponding query logs, the information classifier selects a set of URLs whose associated web pages are deemed to be relevant to the query. Note that the terms "URL," "web page," and "search result" are often used interchangeably throughout the specification because of the one-to-one mapping between the three terms.

After identifying a set of URLs (308-1) for the query log record being processed, the information classifier 136 applies (308-2) weighting criteria to the classification of the identified URLs. The weighting criteria are used for estimating the relevance of each of the URLs to the query. In some embodiments, the weighting criteria include the IR score, navigation rate, impression, position and click data for the URL. These weighting criteria are used to determine a weight (or score) corresponding to the relevance of the URL to the query. For example, a URL that appears at or near the top of the search results corresponding to a particular query is deemed to be more relevant to the query than other search results appearing lower in the search results. Similarly, a URL that has a high navigation rate, i.e., has historically been selected at a high rate by users who submitted the same query, is also given more weight when considering its relevance to the query than a URL (at a similar position in the search results) having a lower navigation rate. Thus, the seed classification data of the URL is considered to be highly relevant to the query and is therefore given more weight in generating the query profile. In some embodiments, a small number of most relevant URLs (e.g., the top two, three or four URLs on the first page of the search results) are given a full weight of 1, and the weights of those less relevant URLs are gradually reduced as a function of their respective search result positions, IR scores, navigation rates, click data, and potentially other URL-specific parameters as well.

As noted above, click data may be used to modify the weights assigned to URLs based on search result position. For example, search results that have been selected for viewing by the user may be assigned the highest possible weight (e.g., the same weight as the highest ranked search result). Alternately, the weights of search results that have been selected for viewing by the user may be given a predefined boost (e.g., as either a fixed increase, or a percentage increase); optionally, a ceiling may be applied to limit the resulting weight so as to not exceed a predefined maximum weight.

Next, the information classifier aggregates (308-3) the weighted classification data of the URLs as the query's own classification data, i.e., the query's profile. Because of the previous weighting step, the query's profile should be more similar to the classification data of those URLs with higher weights. It is noted that URL's (in the search results) for which there is no seed classification data have no influence on the profile of the query. Although this process of spreading classification data from the URLs to the queries may not explicitly consider the content of the web pages identified by the URLs and its relevance to the query, it should be noted that the historical query information, such as impression data (e.g., IR score, position data) and click data of the search results, already includes the influence of the web page's content.

As described above, the aggregation operation 308-3 only uses classification from URLs that have been classified, and thus have classification data in the seed database 138, when generating the query profiles. However, in some embodiments, during a subsequent iteration of the query profile classification process 300, the "seed data" for the query classification process can be the classification data for URLs classified during an earlier iteration of the URL classification process 320 (described below). In other words, during subsequent iterations of the query classification process 300, the seed database 138 may be replaced by the information classification database 134 (or a subset of that database) generated during an earlier iteration of the URL classification process 320.

Finally, in some embodiments the information classifier stores (310) the generated query profiles in the query profile database 142. In these embodiments, the spreading process first generates query profiles from the classification data of the classified URLs, as described above in connection with FIG. 3A, and then generates classification data of the unclassified URLs from the query profiles, as described below in connection with FIG. 3B.

Figure 7:
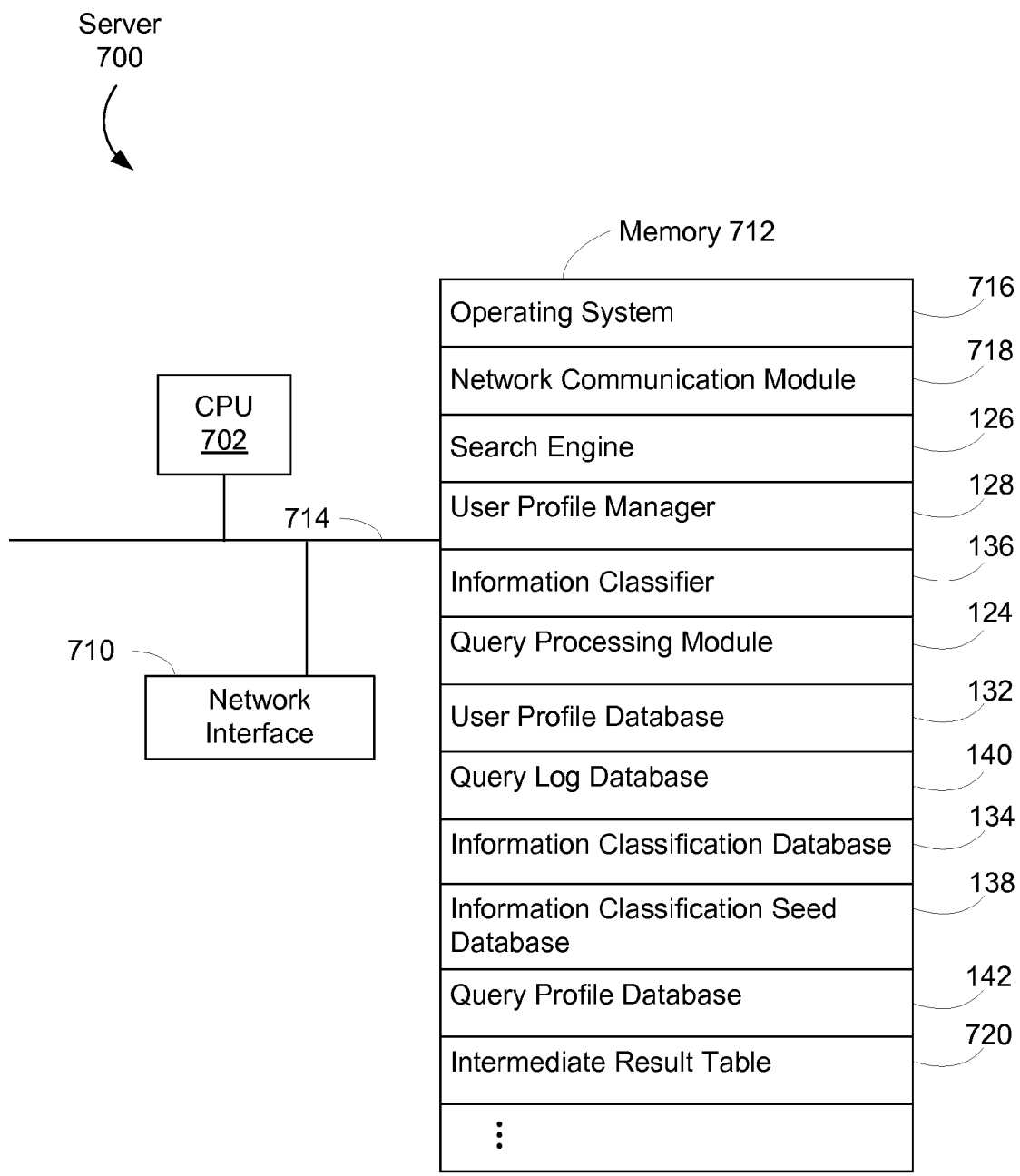
FIG. 7 is a block diagram of an exemplary server system in accordance with some embodiments.

In other embodiments, after each query profile is generated, weighted copies of the query profile (e.g., one for each search result listed in the query log record corresponding to the query profile) are written to entries in an intermediate result table (720, FIG. 7). Optionally, the query profile is not stored in a query profile database, as it is no longer needed for spreading information to URLs associated with the corresponding query log record. In these embodiments, after all the query log records have been processed, the entries for each URL in the intermediate result table are aggregated to produce a respective profile for each URL for which sufficient classification information has been written to the intermediate result table. A control flow representation of these embodiments is provided in Table 1. In particular, in a first phase, each query log record is processed to produce a query profile, and then the query profile is "spread" by producing entries in the intermediate result table for each URL listed in the query log record (or, alternatively, each URL in an identified subject of the URLs listed in the query log record). Each entry stored in the intermediate result table (for the query log record being processed) corresponds to a particular URL of the search results listed in the query record, and contains a weighted version of the query profile. In the entry corresponding to a particular URL and a particular query, the weight given to the query profile is based on the relevance of the URL to the query, as explained in more detail above. In a second phase, after the intermediate result table has been populated with entries from the processing of the query log records, the entries for each URL are aggregated to produce classification data for that URL, and the resulting classification data for each URL is stored in a classification database. As explained in more detail elsewhere, if the number of entries for a URL is smaller than a threshold value, or other quality criteria are not satisfied, classification data for a URL is either not generated or not stored in the classification database.

TABLE 1

```
// First Phase //
For each query log record {
    generate query profile by aggregating seed classification data for URLs
    listed in the query log record (see description of Figure 3A);
    optionally, the query profile is not stored in a query profile database;
    For each URL listed in the query log record (alternatively: For each
    URL in an identified subset of the URLs listed in the query log
    record) {
        generate an entry (keyed by the URL) in the intermediate result table,
        which is a weighted version of the query profile for the query log
        record (see description of operation 328-5, Figure 3B);
    }
}
// Second Phase //
For each distinct URL in the intermediate result table {
    aggregate the weighted query profiles for that URL to generate
    classification data for the URL (see description of operation 328-6,
    Figure 3B); store the classification data for the URL in an information
    classification database (see description of operation 330, Figure 3B);
}
```

In any of these embodiments, the process of generating classification data for URLs may either be performed for all URLs listed in the query log records, including both classified and unclassified URLs, or alternately, the process may generate classification data only for unclassified URLs (in which case the seed classification data for the classified URLs remains the classification data for those URLs). Alternately, classification data may be generated for other subsets of the URLs listed in the query log records, based on various selection criteria.

Referring now to FIG. 3B, based at least in part on the query log information retrieved (322) from the query log database 140 and the query profiles retrieved (324) from the query profile database 142, the information classifier 136 generates/updates (326) the classification data for web pages identified by URLs found in the search results. First, the information classifier 136 identifies (328-1) a set of queries and corresponding query histories from the query log database 140. Note that this set of queries can be the same set of queries the information classifier 136 previously identified and each query has an associated query profile in the query profile database 142. Each of the queries is associated with a plurality of search results, some of which are classified (e.g., have classification data in the seed database 138) and some of which are not.

The information classifier 136 then identifies (328-2) from the query profile database 142 the query profiles corresponding to the set of queries. These query profiles are used for generating/updating the classification data of at least some URLs found in the search results. As noted above, the profile of a query is built at least in part on the classification data of different URLs in different sets of search results that correspond to the same query. But their contributions may vary depending on each URL's relevance to the query in a particular set of search results. As noted above, the aggregation of URL classification data to produce a query profile is weighted in accordance with the IR scores, navigation rates, search results positions and click data of the URLs in the search results of the query.

Reciprocally, the classification data of a URL may be derived at least partially from the profiles of the queries in which the URL is listed as a search result. In some embodiments, the contributions from these query profiles to the classification data of the URL are dependent on the URL's relevance to each of the queries, as indicated by the search result position data and click data for the queries. For example, assume that a URL appears in the search results corresponding to two different queries A and B. For query A, the URL appears at the top of the search results and is also selected by the user; for query B, the same URL is on the fifth page of the search results and is never selected or viewed by the user. Such weighting information is identified (328-3) or derived from the corresponding query log information. When determining the contributions of the two query profiles to the classification data of the URL, the information classifier 136 applies (328-4) the weighting criteria to them such that query A's profile is given more weight over query B's profile, provided that any other weighting factors associated with the two queries are substantially the same.

In some embodiments, the information classifier 136 stores (328-5) the weighted query profiles in an intermediate result table. Each entry in the intermediate result table represents, for a given URL, the contribution of one weighted query profile to the classification data for that URL. There is a many-to-many mapping between query IDs and URL IDs in the table. For a given query ID, a set of URL IDs can be found in the table, each URL ID corresponding to a weighted version of the query profile. For a given URL ID, a set of entries can be found in the table, one for each query for which the URL ID appears in the search results. Stated in another way, operation 328-5 is performed by: For each query in the log, storing to the intermediate result table an entry for each URL in the search results; the entry comprising a weighted version of the category list in the query's query profile. This is repeated for each query in the query log, thereby generating a very large number of entries in the intermediate result table. Then, aggregation operation 328-6 is performed by: For each distinct URL in the intermediate result table, aggregate all the entries in the intermediate result table.

In some embodiments, the aggregated classification data for the URLs is normalized so that, 1) for the same category that appears in the category lists of different URLs, their respective weights are comparable; and 2) the total number of queries in which a URL appears in the search results has little or no impact on the strength of the category weights in the classification data (category list) for that URL. For example, as a result of the normalization, the sum of the category weights for a URL appearing in the results of 100 queries in the query log are not lower than the sum of the category weights for a URL appearing in the results of 500 queries in the query log. In some embodiments, if the total number of queries in which a URL appears is below a predefined threshold, a profile for that URL is not produced because there is insufficient data to produce a sufficiently reliable URL. It is noted that a query weight or weighting factor is associated with each entry in the intermediate result table, which is based both on the query profile's total weight and the strength of the linkage between the query and the URL for the entry. When aggregating (328-6) the classification data for a respective URL, the sum of the query weights for the table entries corresponding to the URL is used as a normalization factor (e.g., as a divisor) when determining the final weights 229 (FIG. 2C) of the categories in the URL's profile 222.

In addition, in some embodiments the category 228 (FIG. 2C) list for a respective URL produced by the aggregation operation 328-6 is truncated or filtered, when the list contains more than a predefined number of distinct categories, so as to exclude the lowest weighted category IDs while retaining the highest weighted category IDs having at least a predefined percentage (e.g., 90%) of the total weights of the categories in the unfiltered category list.

Upon completion of the aggregation operation 328-6. The classification data for each URL is stored (330) in the information classification database 134.

As explained above (see Table 1 and the description of the control flow shown in Table 1), in some embodiments, the aforementioned process of spreading the classification data from the classified URLs to the unclassified URLs is implemented on a query record-by-query record basis, without producing a query profile database.

In some embodiments, the number of query terms associated with a query record is also factored into the weighting and spreading of classification data from a query profile to the URLs listed in the search results of the corresponding query record. Generally, the more terms a query has, the more specific the query is and the more focused the search results would be with respect to topicality. Conversely, the fewer terms a query has, the more ambiguous the query is and the more likely that the search results will include results on different topics. For example, the search results corresponding to the single-term query of "jaguar" includes http://www.jaguar.com/global/default.htm, which is the official website of the Jaguar-brand luxury car, and http://en.wikipedia.org/wiki/Jaguar, which is the Wikipedia web page about the large cats known as jaguars. In contrast, the search results corresponding to the two-term query of "jaguar car" still include the official website of the Jaguar-brand luxury car. But these search results will not include the web page about large cats know as jaguars, and instead will include another search result relevant to the Jaguar brand for cars, such as the http://en.wikipedia.org/wiki/Jaguar_Cars, the Wikipedia web page about the Jaguar automobile brand's history.

In some embodiments, the contribution of a query's classification data (also called the query profile) to the classification data of the URLs listed in the search results of the query is weighted in accordance with the number of query terms in the query. For example, the temporary classification data of one-word (or one-character in some Asian languages) query is given the least weight. The more words or characters a query has, the more weight is assigned to its classification data. Thus, the entry in the intermediate result table for a particular URL, with respect to a particular query, will have a more highly weighted copy of the query's classification data when the query contains multiple terms, and will have a lower weighted copy of the query's classification data when the query contains only a single term. Depending on a specific language, the role of the query length in weighing the classification data becomes less important when it reaches a minimum threshold (e.g., two or three words in English and some other languages).

Other measures of the ambiguity or specificity of a query include the distribution of the corresponding classification data. For a specific query, e.g., "jaguar car," most, if not all, of the search results should be limited to one topic, i.e., the luxury car brand. As a result, the temporary classification data of the query derived from the classification data of the corresponding search results will be focusing on the same topic. In contrast, a less specific query like "jaguar" should see the distribution of classification data over at least two topics, the luxury car brand and the big cat. Another way of measuring the ambiguity or specificity of a query is to examine the correlation of the classification data of the URLs in the search results, e.g., by averaging the pair wise cosine similarities of the URLs. Stated another way, the average cosine similarity of the search results corresponds to (or is a metric of) the level of specificity of the search query. For example, the average cosine similarity of the search results is high when the search results are very similar to each other (e.g., most results concern a single major topic), indicating that the search query has high specificity. The more diverse the search results, the smaller the average cosine similarity, indicating that the search query has low specificity.

Figure 3C:
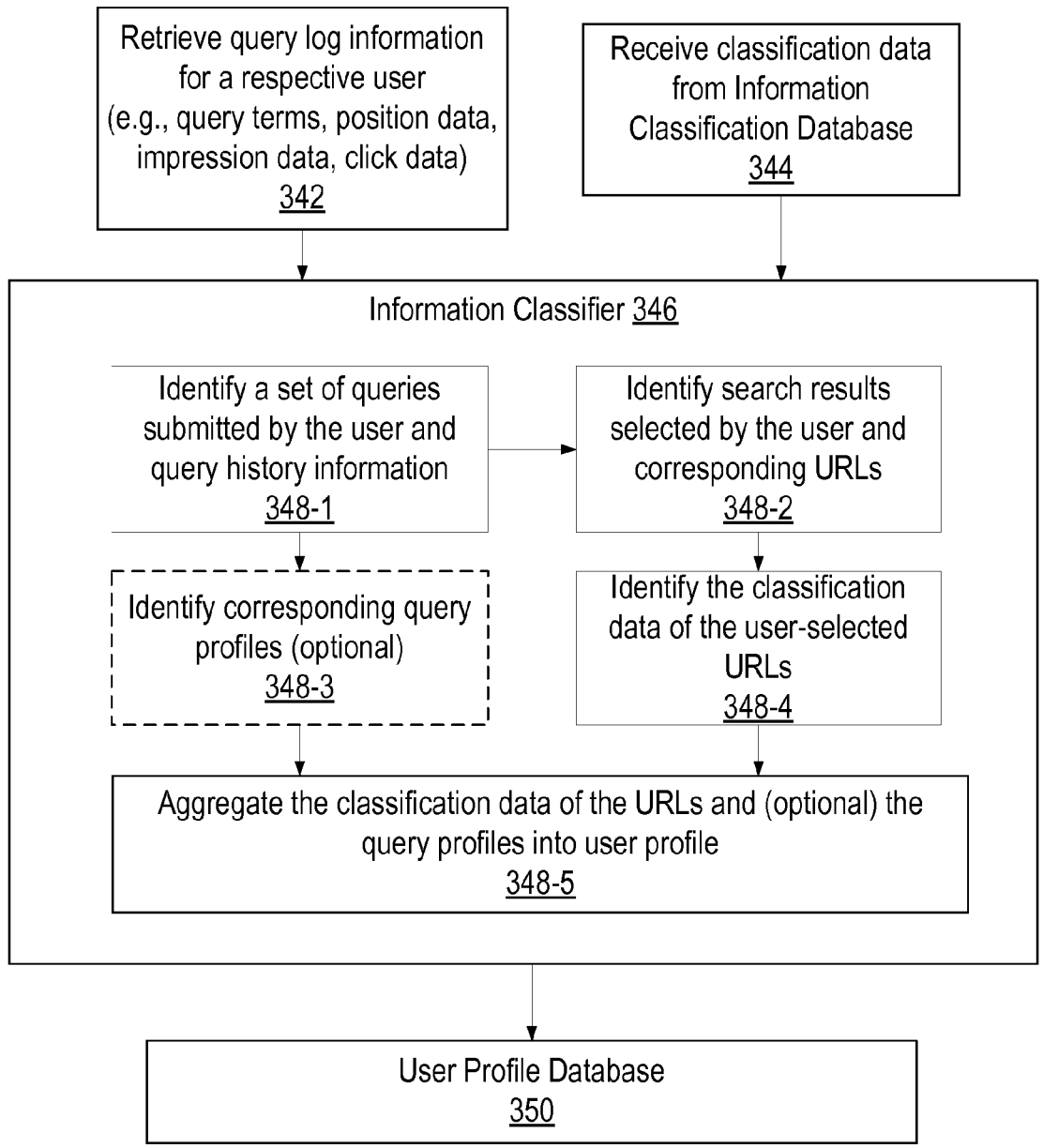
FIG. 3C is a flow diagram illustrating an exemplary process for building the user profile database in accordance with some embodiments.

Like a user's browsing history, the user's search history (such as the queries submitted by the user and the search results selected by the user) is also a good source for profiling the user's search interests. FIG. 3C is a flow diagram illustrating an exemplary process 340 for building a user profile based on the classification data of the search result URLs selected by the user.

Based at least in part on the query log information retrieved (342) from the query log database 140 and the classification data retrieved (344) from the information classification database 134, the information classifier 136 identifies (348-1) a set of queries submitted by a respective user and corresponding query histories from the query log database 140. From the query histories, the information classifier 136 identifies (348-2) the search results selected by the user and the corresponding URLs. For each of the URLs, the information classifier identifies (348-4) its classification data from the database 134.

In some embodiments, the information classifier 136 aggregates (348-5) the classification data of the user-selected search result URLs into a user profile. Note that different weighting or filtering criteria can be used when aggregating the classification data of the URLs. For example, in some embodiments the frequency of a URL being selected by a user is factored into the weight of the URL's classification data. In some embodiments, when two URLs having similar numbers of user clicks, the classification data of a URL for which the user has demonstrated sustained interest (e.g., N user clicks spread approximately evenly over a month), is given greater weight in determining the user's profile than a URL for which a similar number of user clicks are concentrated in a short period of time (e.g., an hour or two). In some embodiments, the time recency of a query is also considered such that the classification data of a URL associated with a more recent query is given more weight than the classification data of a URL associated with a more remote query. In some embodiments, the importance of a particular cluster or category is also taken into account when profiling a user. For example, a common cluster or category for a group of individuals including the user is less helpful in determining the user's interest and should be given less weight than more distinct clusters or categories.

The resulting user profile is then used by the information server system 130 to provide personalized service for the user. For example, in response to a query from the user, the search engine 126 identifies a set of search results and the search results are initially ordered by their relevance to the query. Before returning the search results to the requesting user, the query processor 124 can re-order the search results by comparing each search result's classification data with the user profile. If both are expressed as a sparse vector, the comparison can be determined by computing the cosine or dot product of the two vectors. The search results are then re-ordered based at least partially on their dot products and then transmitted to the client device 104 of the requesting user, for display to the requesting user at the client device 104.

In some embodiments, the information classifier 136 also identifies (348-3) the query profiles of the queries submitted by the user and aggregates (348-5) both the query profiles and the classification data of the user-selected URLs into the user profile and stores (350) the resulting user profile in the database 132.

Note that any of the three methods described above, with reference to FIGS. 3A, 3B and 3C, can be an iterative process. The information classifier begins with the classification data of a limited number of URLs in the seed database 138 and spreads the classification data into a set of query profiles, the classification data of those unclassified URLs, and a set of user profiles. As shown in FIGS. 3A-3C, the historical query information plays an important role in profiling a query, a URL or a user. The process of spreading classification data is an ongoing process, repeated or updated over time, because the query log database keeps accumulating new query log information. The new query histories not only provide more data points to refine the classification data of a URL but also keep track of the dynamic aspect of many users' search interests.

In some embodiments, the information classifier 136 repeats the processes described above to update one or more of the query profile database 142, the information classification database 134, and the user profile database 132. In some embodiments, a subset of the information classification database 134 is chosen as the new seed database 138 to spread the classification data. In some embodiments, the information classification seed database 138 is generated by another clustering method.

In some embodiments, before starting a new round of classification data spreading, the information classifier 136 may refresh the query profile database 142, the information classification database 134, or the user profile database 132 such that no legacy classification data is preserved. In some other embodiments, the information classifier 136 may keep at least a subset of data records in the query profile database 142, the information classification database 134, or the user profile database 132 if these data records are deemed to be still reliable and useful.

In some embodiments, the aforementioned method can be used to profile a website if the classification data of at least a subset of the web pages associated with the website is known. This may be implemented by a straightforward aggregation of the classification data of different web pages. Alternatively or additionally, the classification data of different web pages are weighted in accordance with their respective positions in the website's hierarchy as well as the popularity or user usage data of the corresponding web pages during a particular time period. Stated in another way, when aggregating web page classification data to produce a profile for the website, weights may be given to the classification of web pages within the website in accordance with 1) the number of user clicks on the website's web pages, or 2) the number of director levels between the web page and the website's home page, or both.

In some embodiments, the clusters or categories that are associated with a large portion of web pages at a web site are given relatively higher weights than clusters or categories that are associated with a smaller portion of the web pages at the web site. In some other embodiments, the lack of at least one common cluster or category among at least a minimum number of web pages at a website (e.g., en.wikipedia.com) may prevent the website from being classified.

Figure 3D:
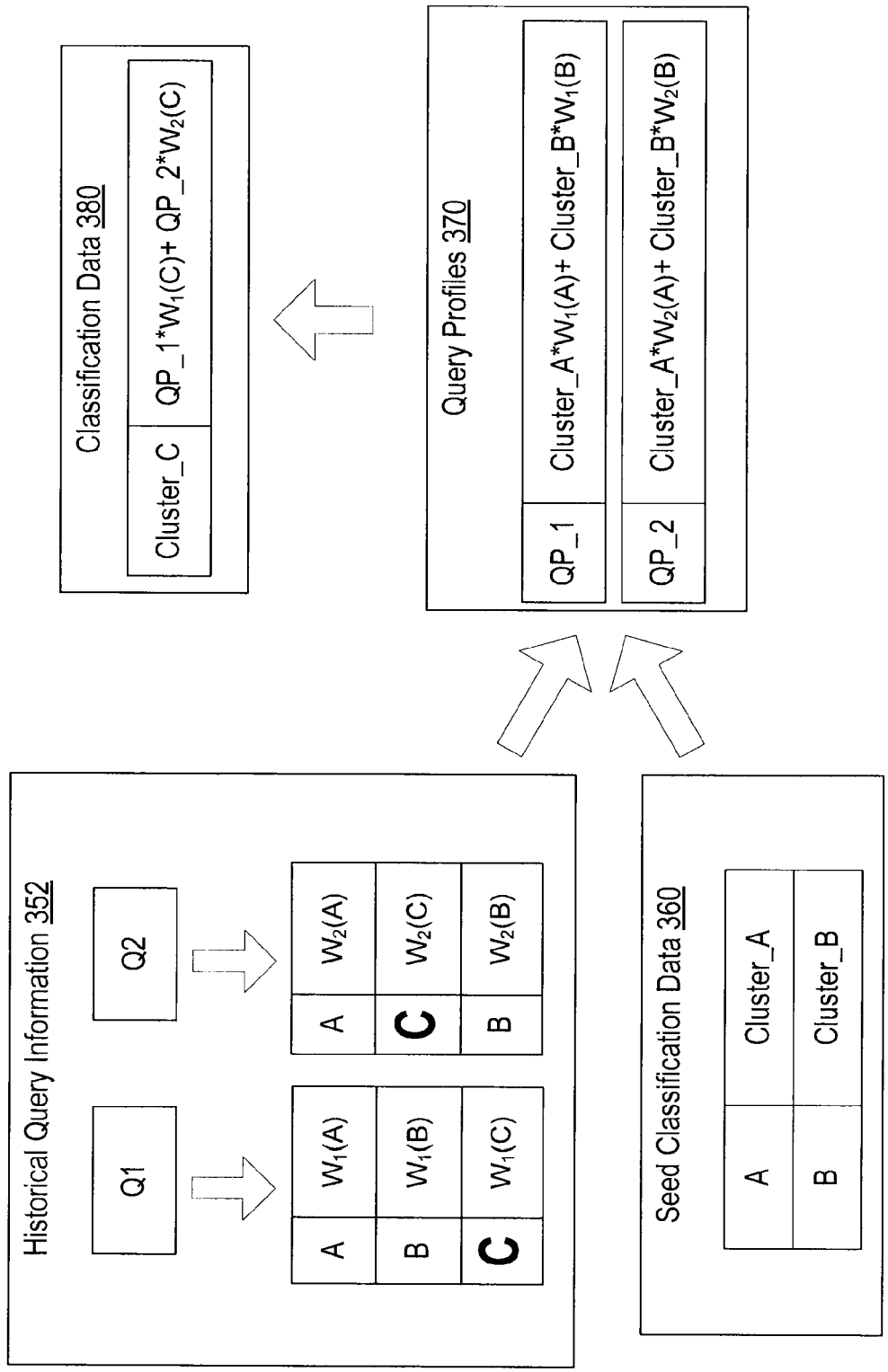
FIG. 3D is a block diagram illustrating an example of classifying an information item using the classification data of other information items in accordance with some embodiments.

FIG. 3D is a block diagram illustrating an example of classifying an information item using the classification data of other information items in accordance with some embodiments.

For illustrative purpose, the historical query information 352 includes two user-submitted queries, Q1 and Q2. But in reality, a large number of query log entries are stored in the query log database 140, each query log entry corresponding to a query submitted by a user during a particular session. The query, comprising one or more query terms, has a corresponding set of search results and user usage data.

For simplicity, each of the two queries Q1 and Q2 is associated with three web pages, A, B, and C, each web page having a weighting factor W indicating the relevance of the web page to the corresponding query. As explained above, the weighting factor may be affected by the corresponding web page's content, its popularity on the Internet, and the associated user usage data such as impression, position and click-through. In this example, it is assumed that two of the three web pages, A and B, have already been classified and their corresponding classification data can be found in the seed classification data 360. The web page C, although being part of the search results, has no associated classification data in the seed classification data 360. But the fact that the web page C appears together with the web pages A and B in the search results corresponding to Q1 and Q2 suggests that it is possible to predict the classification data of the web page C based on at least the seed classification data of the web pages A and B.

In some embodiments, the first step of this prediction, sometimes herein called spreading of the seed classification data, is to build the classification data or profiles for Q1 and Q2. As shown in FIG. 3D, the two query profiles 370, QP_1 and QP_2, are defined as a function of the classification of the two web pages modulated by the corresponding weighting factors. The second step of the prediction is to build the xclassification data for the unclassified web page C by projecting the two query profiles into the domain of the classification data of the web page C. Because the two weighting factors $W_1(C)$ and $W_2(C)$ indicate, at least in some aspect, the relevance of web page C to the two queries, these weighting factors are used to determine the contribution of the respective query profiles to the classification data of the web page C. It should be noted that the mathematical expressions in the figure or anywhere throughout the specification are for illustrative purposes only. There are other ways of aggregating and weighting the classification data of the web pages A and B in their respective contribution to the composition of the query profiles, as described above in conjunction with FIG. 3A, and there are also other ways of aggregating and weighting the classification data of the query profiles QP_1 and QP_2 in their respective contribution to the classification data for web page C.

It should also be noted that a typical query's search results correspond to hundreds or even thousands of web pages, and the same query, when submitted by different users or even by the same user but at different times, could have slightly different sets of search results. By the same token, the same web page may appear in different sets of search results corresponding to different user-submitted queries and draw different user responses. The example shown in FIG. 3D, i.e., each of the two query profiles is generated from the classification data of two web pages and the classification data of the web page C is generated from two query profiles, is only for illustration.

Given the nature of the many-to-many relationship between queries and web pages, in some embodiments, the information classifier only uses the classification data of a subset of the web pages for building the query profiles or uses weighting factors to prioritize one subset over another subset. For example, if the number of queries for which a web page appears in the corresponding search results is below a predefined limit, this web page may be skipped in the spreading of classification data. Similarly, the information classifier may consider only the profiles of a subset of the queries for estimating the classification data of an unclassified web page, or may weight one subset over another subset in accordance with predefined heuristics. For example, the spreading of classification data from classified web pages to unclassified web page may be limited to a particular query. In some other embodiments, the scope of spreading may be expanded to cover, e.g., different queries within the same session, or different sessions by the same user, or different queries by the same group of users.

Figure 4:
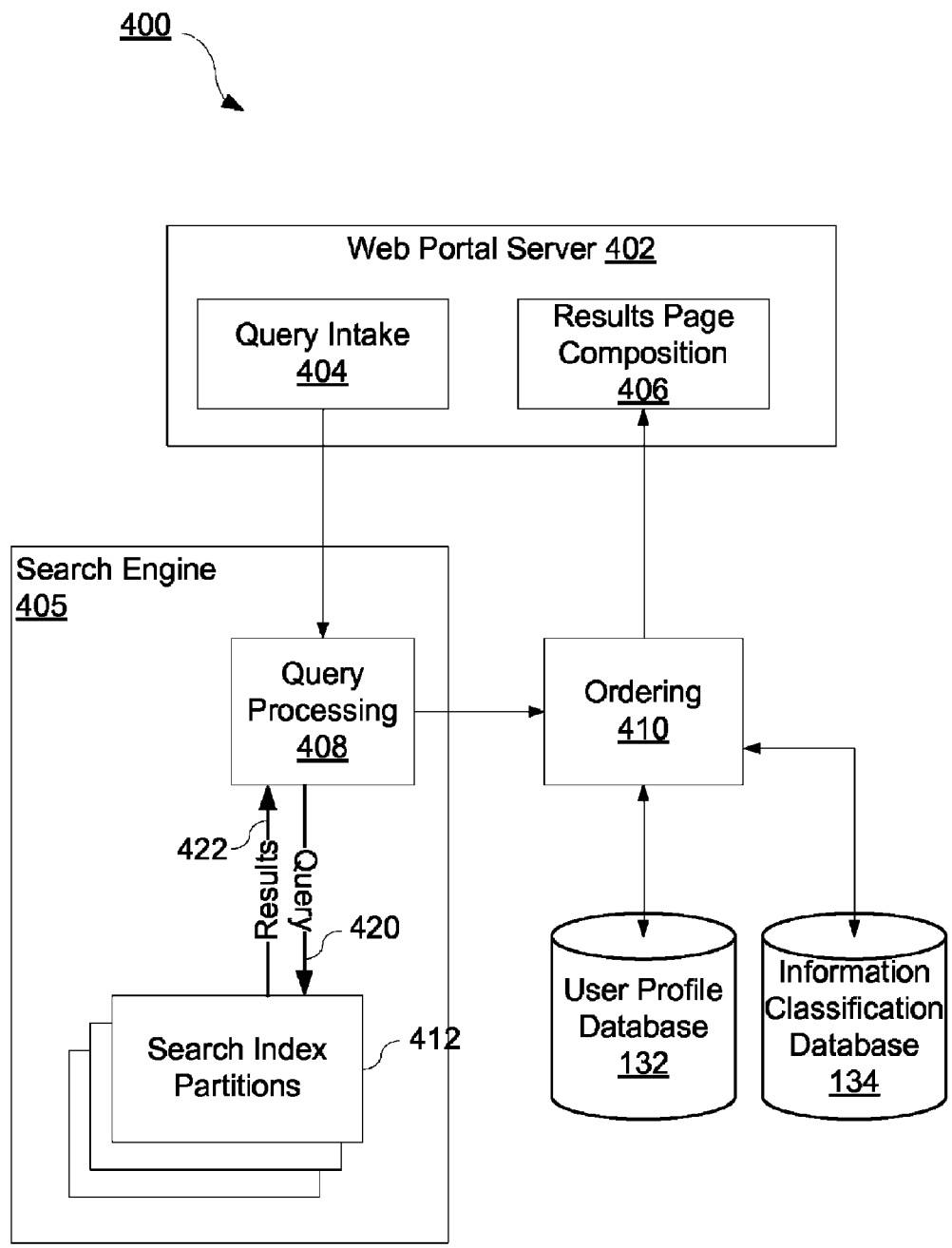
FIG. 4 is a block diagram illustrating an exemplary process for processing a query and ordering the corresponding query results using user profile and information classification data in accordance with some embodiments.

FIG. 4 is a block diagram illustrating an exemplary process 400 for processing a query and ordering the corresponding query results using the user profile and classification data in accordance with some embodiments. A web portal server 402 receives queries through a query intake interface or process 404 and sends to the requesting client 104 results information (which may be formatted as a web page, for example, by a results page composition process or module 406) for display at the client 104. The received request is processed by a search engine 405 to produce a set of search results 422 that match or otherwise satisfy a query 420. The search engine 405 may include one or more query processing modules or processes 408 that controls or oversees the searching of a set of search index partitions 412 for documents or other search results matching the query 420. A list of search results are returned 422 by the search engine, and the search results in the list are then ordered 410 according to the corresponding user profile (from user profile database 132) of the requesting user and the classification data (from information classification database 134) of the search results. Results information, including the ordered search results, is forwarded to the results page composition module 406 for conversion into a format (e.g., a web page or XML document) suitable for sending to the requesting client. In some embodiments, the search engine 405 encompasses all of system components for performing the process 400.

Figure 5A:
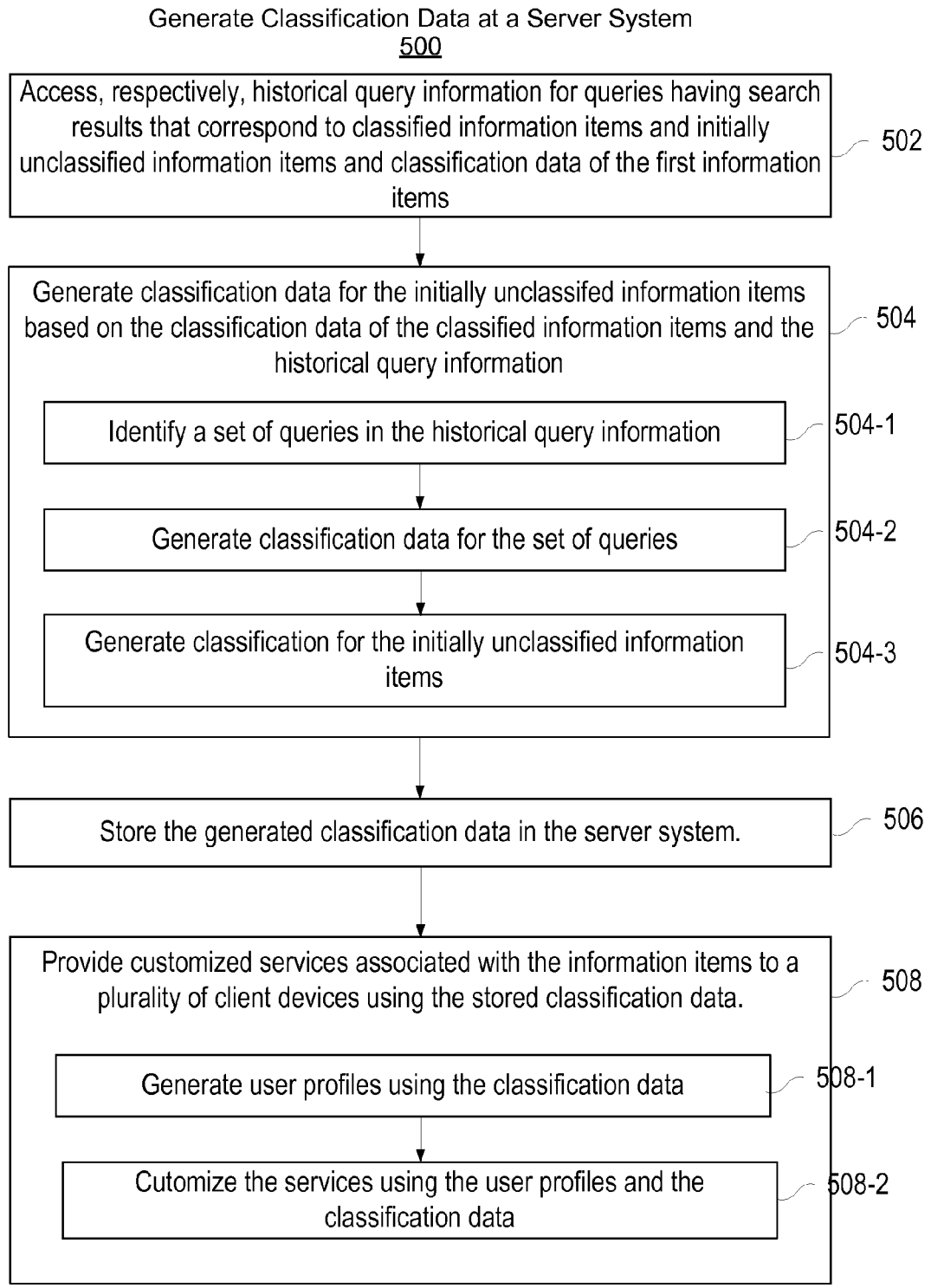
FIG. 5A is a flow diagram illustrating an exemplary process for generating classification data and providing customized services using the classification data in accordance with some embodiments.

FIG. 5A is a flow diagram illustrating an exemplary process 500 for generating classification data and providing customized services using the classification data in accordance with some embodiments. To some extent, this process 500 is a summarization of the three processes separately described above in connection with FIGS. 3A-3C.

At a server system, the process accesses (502) historical query information for queries and their associated search results. For example, the historical query information may correspond to the query histories stored in the query log database. Some of the search results correspond to initially classified information items and others corresponds to initially unclassified information items. For clarity, the initially classified information items are called "first information items" and the initially unclassified information items are called "second information items." From the information classification seed database, the process accesses classification data of the first information items. Using the historical query information and the seed classification data, the process generates (504) classification data for the second information items and stores (506) the generated classification data in the server system such as the information classification database 134 of FIG. 1.

In some embodiments, in order to generate the classification data for an initially unclassified information item, the process identifies (504-1) a set of queries in the historical query information. At least a subset of the queries each has an associated search result corresponding to the initially unclassified information item. The process then generates (504-2) classification data or a query profile for each of the queries based on the classification data of the first information items and the historical query information for the set of queries.

In some embodiments, for each of the queries, the process identifies a set of search results corresponding to the query and a set of the first information items corresponding to the set of search results (e.g., 308-1 of FIG. 3A). Next, the process weights the classification data of the identified first information items in accordance with information such as their respective predefined information retrieval scores, their corresponding search results' positions in the set of search results, and information denoting user interaction with the corresponding search results (e.g., 308-2 of FIG. 3A). Finally, the process aggregates the weighted classification data of the identified first information items to generate the query's classification data, also called its query profile (e.g., 308-3 of FIG. 3A).

Using the query profiles of the identified queries and the historical query information for the queries, the process generates (504-3) classification data for the initially unclassified information items. In some embodiments, this includes identifying a set of queries (e.g., 328-1 of FIG. 3B) and retrieving the corresponding query profiles from the query profile database (e.g., 328-2 of FIG. 3B). For each of the queries, the process identifies a set of search results corresponding to the query (e.g., 328-3 of FIG. 3B). The set of search results includes at least one search result corresponding to the initially unclassified information item. Next, the process weights the classification data or query profile of the query in accordance with information such as the initially unclassified information item's information retrieval score (as generated by the search engine 126 when processing the query to generate search results), its corresponding search result's position in the set of search results, and user interaction (if any) with the corresponding search result (e.g., 328-4 of FIG. 3B). Finally, the process aggregates the weighted classification data of the queries to generate classification data (sometimes called a URL profile) for the initially unclassified (second) information item (e.g., 328-6 of FIG. 3B). The same process can also be performed to generate new classification information for the initially classified (first) information items.

After building the classification data for the first and second information items, the process can provide (508) customized services associated with the first and/or second information items to a plurality of client devices using the corresponding classification data stored in the server system.

In some embodiments, the process generates (508-1) user profiles using the classification data of the first and second information items. In response to a request for service from the user at a client device, the process customizes (508-2) the requested services using the user profiles and the corresponding classification data. To generate a user profile, the process first identifies a set of queries submitted by a user in the historical query information and the corresponding search results (e.g., 348-1, 348-2 of FIG. 3C). The search results correspond to one or more of the first and second information items. The process then identifies the classification data of the user-selected information items and aggregates the classification data of the user-selected information items (e.g., 348-4, 348-5 of FIG. 3C).

In some embodiments, the process performs a user-independent service in response to the service request. The user-independent service generates an initial result that includes one or more of the first and second information items. For each of the information items in the initial result, the process determines a score by comparing the information item's classification data with the user profile and then re-orders the information items in the initial result in accordance with their respective scores so as to generate a customized result. Exemplary services that may be customized include, without limitation, personalized search, target-oriented advertisement or campaign, and individual matching in an online social network, etc.

Figure 5B:
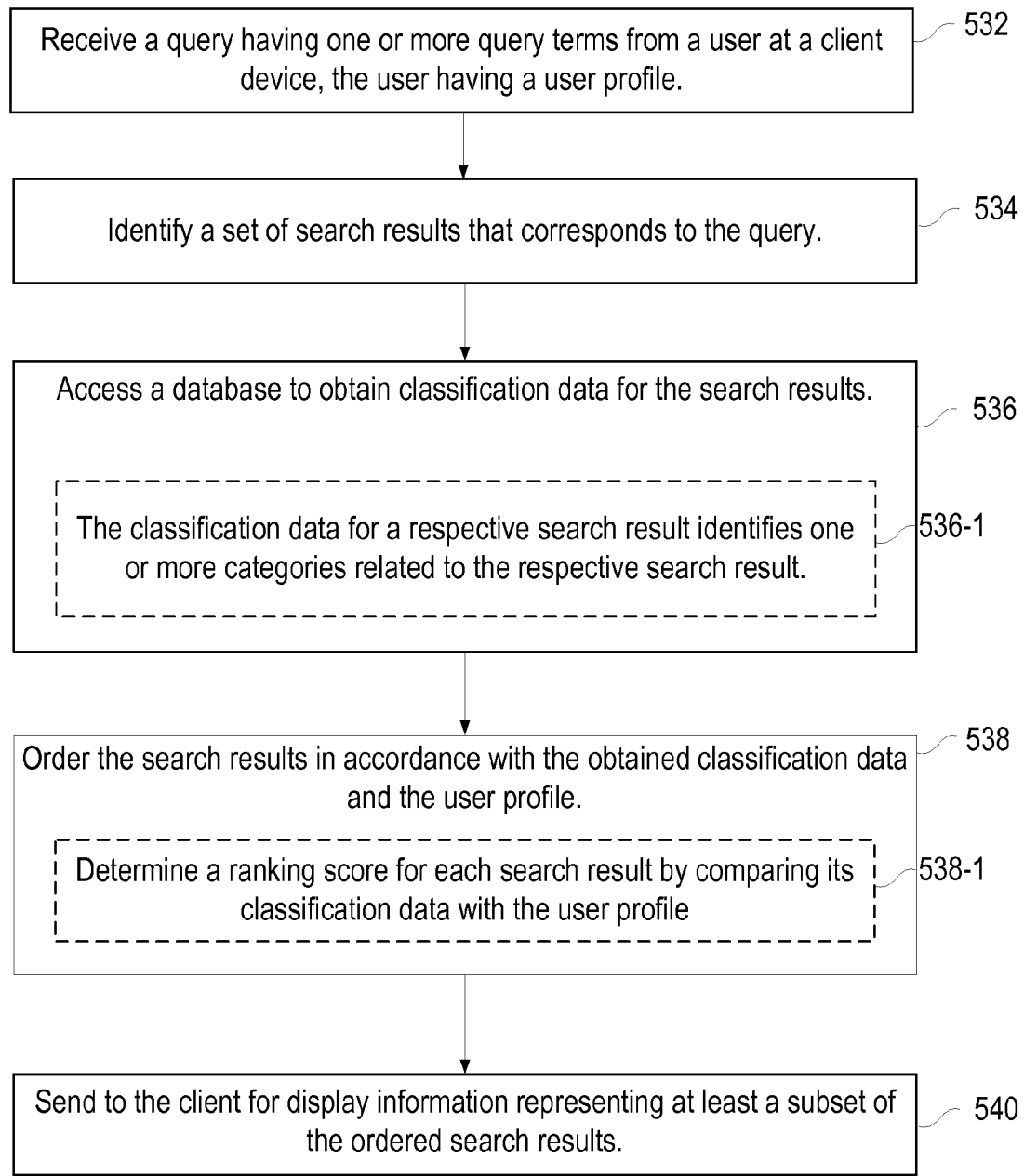
FIG. 5B is a flow diagram illustrating an exemplary process for providing personalized search results for a user at a remote client device using the user's user profile and the classification data in accordance with some embodiments.

FIG. 5B is a flow diagram illustrating an exemplary process for providing personalized search results for a user at a remote client device (remotely located from the information server system) using the user's user profile and the classification data in accordance with some embodiments. After receiving a query from a user at a respective client device (532), the process first identifies a set of search results corresponding to the query (534). At least one of the search results is associated with one of the second information items. The process accesses the information classification database to obtain classification data for the search results (536). The classification data for a respective search result identifies one or more categories related to the respective search result (536-1). Next, the process determines a score for the search result by comparing its classification data with a user profile (538-1) and orders the search result with respect to the other search results in accordance with the determined score (538). Finally, the process sends to the client device, for display at the client device, information representing at least a subset of the ordered search results (540).

Figure 6:
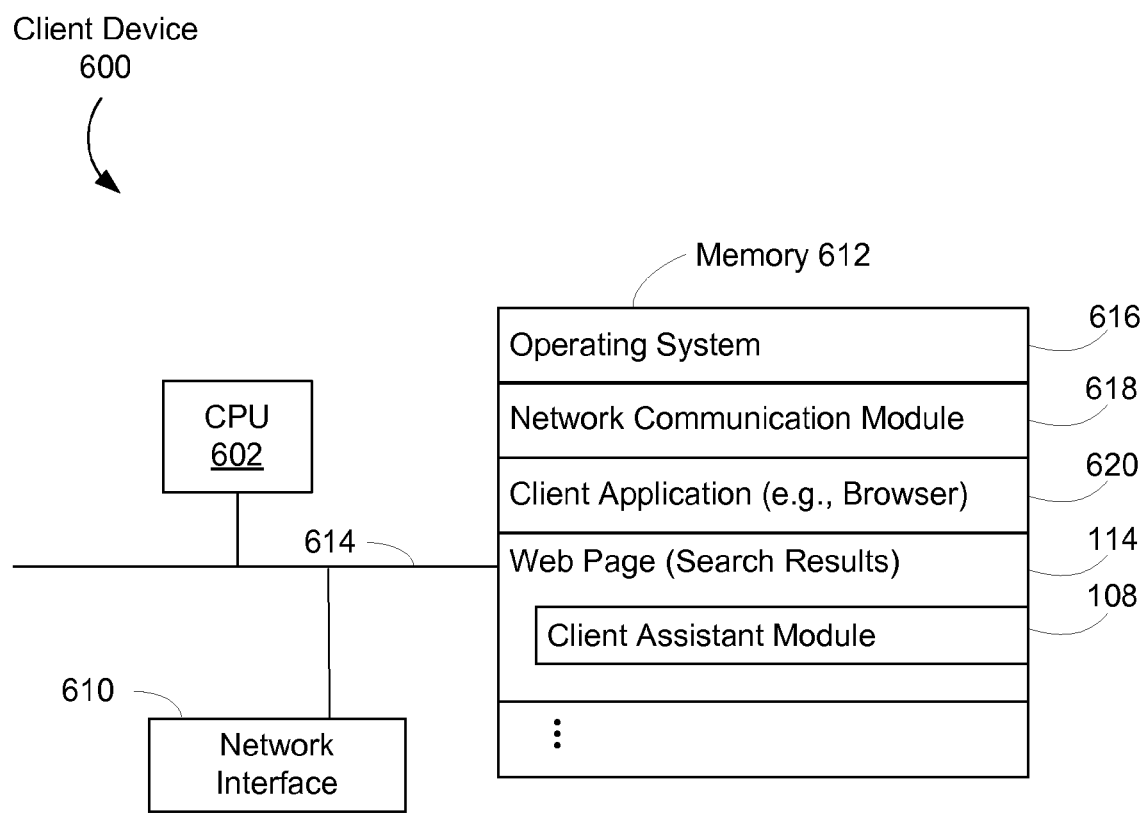
FIG. 6 is a block diagram of an exemplary client device in accordance with some embodiments.

FIG. 6 is a block diagram of a client device 600 in accordance with some embodiments. The device 600 generally includes one or more processing units (CPU's) 602, one or more network or other communications interfaces 610, memory 612, and one or more communication buses 614 for interconnecting these components. The communication buses 614 may include circuitry (sometimes called a chipset) that interconnects and controls communications between system components. The client device 600 optionally may include a user interface 605, for instance a display and a keyboard. Memory 612 may include high speed random access memory, such as DRAM, SRAM, DDR RAM or other random access solid state memory devices; and may also include non-volatile memory, such as one or more magnetic disk storage devices, optical disk storage devices, flash memory devices, or other non-volatile solid state storage devices. Memory 612 may include mass storage that is remotely located from the central processing unit(s) 602. Memory 612, or alternately the non-volatile memory device(s) within memory 612, comprises a computer readable storage medium. Memory 612 or the computer readable storage medium of memory 612 stores the following elements, or a subset of these elements, and may also include additional elements:
- an operating system 616 that includes procedures for handling various basic system services and for performing hardware dependent tasks;
- a network communication module 618 that is used for connecting the client 104 to other servers or computers via one or more communication networks (wired or wireless), such as the Internet, other wide area networks, local area networks, and metropolitan area networks and so on;
- a client application 620, such as a browser; and
- a client assistant 108 (e.g., toolbar, browser plug-in), for monitoring the activities of a user; in some embodiments, the client assistant, or a portion thereof, may be embedded in a respective search result web page returned to the client in response to a query.

FIG. 7 is a block diagram illustrating an information server system 700 in accordance with some embodiments. System 700 generally includes one or more processing units (CPU's) 702, one or more network or other communications interfaces 710, memory 712, and one or more communication buses 714 for interconnecting these components. System 700 optionally may include a user interface comprising a display device and a keyboard. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a computer readable storage medium. Memory 712 or the computer readable storage medium of memory 712 stores the following elements, or a subset of these elements, and may also include additional elements:

- an operating system 716 that includes procedures for handling various basic system services and for performing hardware dependent tasks;
- a network communication module 718 that is used for connecting the information server system 130 to other computers via the one or more communication network interfaces 710 (wired or wireless) and one or more communication networks, such as the Internet, other wide area networks, local area networks, metropolitan area networks, and so on;
- a search engine 126 for processing queries;
- a user profile manager 128 for processing data relating to user profiles, and optionally for building and/or updating user profiles;
- an information classifier 136 for building and maintaining classification data;
- a query processor 124 for ordering search results according to the classification data of the search results and user profile information;
- a user profile database 132 for storing user profile information;
- a query log database 140 for storing user historical query information;
- an information classification database 134 for storing classification data; in some embodiments, the database 134 also includes seed classification data, while in other embodiments a separate seed classification database 138 is stored in memory of the server system 700;
- a query profile database 142 for storing classification data (or profiles) of user-submitted queries; and
- an intermediate result table 720.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. For example, some of the modules and/or databases shown in FIG. 7 may be encompassed within the search engine 126. In some embodiments, memory 612 and 712 may store a subset of the modules and data structures identified above. Furthermore, memory 612 and 712 may store additional modules and data structures not described above.

FIGS. 6 and 7 are intended more as functional descriptions of the various features of a client system and server system rather than a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. For example, the information classifier 136 may be implemented on a different set of servers than the other components of server system 700. The actual number of servers used to implement server system 700, and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
    at a server system having one or more processors and memory,
        respectively accessing historical query information for queries having search results that correspond to first information items and second information items, wherein the first information items are initially classified and the second information items are initially unclassified;
        accessing classification data of the first information items;
        generating classification data for the initially unclassified information items based on the classification data of the first information items and the historical query information;
        storing the generated classification data in the server system; and
        providing customized services associated with the second information items to a plurality of client devices using the corresponding classification data stored in the server system;
    wherein generating classification data for an initially unclassified information item includes:
        identifying a set of queries in the historical query information, wherein at least a subset of the queries each has an associated search result corresponding to the initially unclassified information item;
        generating classification data for the set of queries based on the classification data of the first information items and the historical query information for the set of queries; and
        generating classification data for the initially unclassified information item by combining the generated classification data of the subset of the queries, each of which has an associated search result corresponding to the initially unclassified information item; and
    wherein generating classification data for the set of queries includes:
        for each of at least a subset of the queries,
            identifying a set of search results corresponding to the query and a set of the first information items corresponding to the set of search results;
            weighting the classification data of the identified first information items in accordance with at least one of: their respective predefined information retrieval scores, their corresponding search results' positions in the set of search results, and user interaction with the corresponding search results; and aggregating the weighted classification data of the identified first information items as the query's classification data.

2. The computer-implemented method of claim 1, further comprising:
updating the historical query information; and
repeating the identification of queries in the historical query information, the generation of classification data for the queries, and the generation of classification data for the initially unclassified information item using the updated historical query information.

3. The computer-implemented method of claim 1, wherein the historical query information comprises historical query information for queries submitted by a community of users.

4. The computer-implemented method of claim 1, wherein providing customized services includes:
receiving a query from a user at a respective client device, wherein the user has an associated user profile; and
responding to the query by:
identifying a set of search results corresponding to the query, wherein one of the search results is associated with one of the second information items;
determining a score for the search result by comparing the stored classification data of the second information item with the user profile;
ordering the search result with respect to the other search results in accordance with the determined score; and
providing data representing at least the ordered search result to the client device.

5. The computer-implemented method of claim 1, wherein providing customized services includes:
identifying a set of queries submitted by a user in the historical query information and the corresponding search results, wherein the search results correspond to one or more of the first and second information items;
generating a user profile for the user by aggregating the classification data of the one or more information items;
storing the generated user profile in the server system; and
in response to a request for service from the user at a client device, customizing the requested service using the stored user profile.

6. The computer-implemented method of claim 5, wherein customizing the requested service includes:
preparing a user-independent service in response to the service request, wherein the user-independent service includes one or more of the first and second information items;
determining a score for each of the one or more information items by comparing the information item's classification data with the stored user profile; and
re-arranging the one or more information items in the service in accordance with their respective scores.

7. The computer-implemented method of claim 1, wherein at least one of the information items is a web page.

8. The computer-implemented method of claim 1, wherein at least one of the information items is a website including multiple web pages.

9. The computer-implemented method of claim 1, further comprising:
updating the classification data of the first information items based on the historical query information and the generated classification data of the initially unclassified information items.

10. The computer-implemented method of claim 1, wherein providing customized services associated with the second information items includes:
identifying generated classification data commonly associated with a plurality of users; and
normalizing the identified classification data for each respective user of the plurality of users in accordance with a level of interest demonstrated by the respective user in the identified classification data relative to other users of the plurality of users.

11. A computer-implemented method, comprising:
at a server system having one or more processors and memory,
respectively accessing historical query information for queries having search results that correspond to first information items and second information items, wherein the first information items are initially classified and the second information items are initially unclassified;
accessing classification data of the first information items;
generating classification data for the initially unclassified information items based on the classification data of the first information items and the historical query information;
storing the generated classification data in the server system; and
providing customized services associated with the second information items to a plurality of client devices using the corresponding classification data stored in the server system;
wherein generating classification data for an initially unclassified information item includes:
identifying a set of queries in the historical query information, wherein at least a subset of the queries each has an associated search result corresponding to the initially unclassified information item;
generating classification data for the set of queries based on the classification data of the first information items and the historical query information for the set of queries; and
generating classification data for the initially unclassified information item by combining the generated classification data of the subset of queries, each of which has an associated search result corresponding to the initially unclassified information item; and
wherein generating classification data for the initially unclassified information item by combining the generated classification data of the subset of queries includes:
for each query of the subset of queries,
weighting the classification data of the query in accordance with at least one of: the initially unclassified information item's predefined information retrieval score, a search result position of a search result corresponding to the initially unclassified information item in a set of search results for the query, and user interaction with the corresponding search result; and
aggregating the weighted classification data of the subset of queries as the initially unclassified information item's classification data.

12. The computer-implemented method of claim 11, wherein generating classification data for the initially unclassified information items further includes:
for each query of the subset of queries,
weighting the classification data of the query in accordance with a number of query-terms in the query.

13. A computer system, comprising:
one or more processors;
memory; and
one or more programs, wherein the one or more programs are stored in the memory and configured to be executed by the one or more processors, the one or more programs including:
  instructions for respectively accessing historical query information for queries having search results that correspond to first information items and second information items, wherein the first information items are initially classified and the second information items are initially unclassified;
  instructions for accessing classification data of the first information items;
  instructions for generating classification data for the second information items based on the classification data of the first information items and the historical query information;
  instructions for storing the generated classification data in the server system; and
  instructions for providing customized services associated with the second information items to a plurality of client devices using the corresponding classification data stored in the server system;
wherein the instructions for generating classification data for an initially unclassified information item include:
  instructions for identifying a set of queries in the historical query information, wherein at least a subset of the queries each has an associated search result corresponding to the initially unclassified information item;
  instructions for generating classification data for the set of queries based on the classification data of the first information items and the historical query information for the set of queries; and
  instructions for generating classification data for the initially unclassified information item by combining the generated classification data of the subset of queries, each of which has an associated search result corresponding to the initially unclassified information item; and
wherein the instructions for generating classification data for the set of queries include:
  for each of at least a subset of the queries,
  instructions for identifying a set of search results corresponding to each of at least a subset of the queries and a set of the first information items corresponding to the set of search results;
  instructions for weighting the classification data of the identified first information items in accordance with at least one of: their respective predefined information retrieval scores, their corresponding search results' positions in the set of search results, and user interaction with the corresponding search results; and
  instructions for aggregating the weighted classification data of the identified first information items as the query's classification data.

14. The computer system of claim 13, further comprising:
instructions for updating the historical query information; and
instructions for repeating the identification of queries in the historical query information, the generation of classification data for the queries, and the generation of classification data for the initially unclassified information item using the updated historical query information.

15. The computer system of claim 13, wherein the instructions for providing customized services include:
  instructions for receiving a query from a user at a respective client device, wherein the user has an associated user profile;
  instructions for identifying a set of search results corresponding to the query, wherein one of the search results is associated with one of the second information items;
  instructions for determining a score for the search result by comparing the stored classification data of the second information item with the user profile;
  instructions for ordering the search result with respect to the other search results in accordance with the determined score; and
  instructions for providing data representing at least the ordered search result to the client device.

16. The computer system of claim 13, wherein the instructions for providing customized services include:
  instructions for identifying a set of queries submitted by a user in the historical query information and the corresponding search results, wherein the search results correspond to one or more of the first and second information items;
  instructions for generating a user profile for the user by aggregating the classification data of the one or more information items;
  instructions for storing the generated user profile in the server system; and
  instructions for customizing the requested service using the stored user profile in response to a request for service from the user at a client device.

17. The computer system of claim 16, wherein the instructions for customizing the requested service include:
  instructions for preparing a user-independent service in response to the service request, wherein the user-independent service includes one or more of the first and second information items;
  instructions for determining a score for each of the one or more information items by comparing the information item's classification data with the stored user profile; and
  instructions for re-arranging the one or more information items in the service in accordance with their respective scores.

18. The computer system of claim 13, wherein the historical query information comprises historical query information for queries submitted by a community of users.

19. The computer system of claim 13, wherein at least one of the information items is a web page.

20. The computer system of claim 13, wherein at least one of the information items is a website including multiple web pages.

21. The computer system of claim 13, further comprising:
  instructions for updating the classification data of the first information items based on the historical query information and the generated classification data of the initially unclassified information items.

22. The computer system of claim 13, wherein instructions for providing customized services associated with the second information items include:
  instructions for identifying generated classification data commonly associated with a plurality of users; and
  instructions for normalizing the identified classification data for each respective user of the plurality of users in accordance with a level of interest demonstrated by the respective user in the identified classification data relative to other users of the plurality of users.

23. A computer system, comprising:
one or more processors;
memory; and
one or more programs, wherein the one or more programs are stored in the memory and configured to be executed by the one or more processors, the one or more programs including instructions for:
respectively accessing historical query information for queries having search results that correspond to first information items and second information items, wherein the first information items are initially classified and the second information items are initially unclassified;
accessing classification data of the first information items;
generating classification data for the second information items based on the classification data of the first information items and the historical query information;
storing the generated classification data in the server system; and
providing customized services associated with the second information items to a plurality of client devices using the corresponding classification data stored in the server system;
wherein the instructions for generating classification data for an initially unclassified information item include instructions for:
identifying a set of queries in the historical query information, wherein at least a subset of the queries each has an associated search result corresponding to the initially unclassified information item;
generating classification data for the set of queries based on the classification data of the first information items and the historical query information for the set of queries; and
generating classification data for the initially unclassified information item by combining the generated classification data of the subset of queries, each of which has an associated search result corresponding to the initially unclassified information item; and
wherein the instructions for generating classification data for the initially unclassified information item by combining the generated classification data of the subset of queries include instructions for:
for each query of the subset of queries,
weighting the classification data of the query in accordance with at least one of: the initially unclassified information item's predefined information retrieval score, a search result position of a search result corresponding to the initially unclassified information item in a set of search results for the query, and user interaction with the corresponding search result; and
aggregating the weighted classification data of the subset of queries as the initially unclassified information item's classification data.

24. The computer system of claim 23, wherein the instructions for generating classification data for the initially unclassified information items further include instructions for:
for each query of the subset of queries, weighting the classification data of the query in accordance with a number of query-terms in the query.

25. A non-transitory computer readable storage medium and one or more computer programs embedded therein, the one or more computer programs comprising instructions which, when executed by a computer system, cause the computer system to:
respectively access historical query information for queries having search results that correspond to first information items and second information items, wherein the first information items are initially classified and the second information items are initially unclassified;
access classification data of the first information items;
generate classification data for the second information items based on the classification data of the first information items and the historical query information;
store the generated classification data in the server system; and
provide customized services associated with the second information items to a pluralit of client devices using the corresponding classification data stored in the server system;
wherein the instructions to generate classification data for an initially unclassified information item include instructions to:
identify a set of queries in the historical query information, wherein at least a subset of the queries each has an associated search result corresponding to the initially unclassified information item;
generate classification data for the set of queries based on the classification data of the first information items and the historical query information for the set of queries; and
generate classification data for the initially unclassified information item by combining the generated classification data of the subset of queries, each of which has an associated search result corresponding to the initially unclassified information item; and
wherein the instructions to generate classification data for the set of queries include instructions to:
for each of at least a subset of the queries,
identify a set of search results corresponding to each of at least a subset of the queries and a set of the first information items corresponding to the set of search results;
weight the classification data of the identified first information items in accordance with at least one of: their respective predefined information retrieval scores, their corresponding search results' positions in the set of search results, and user interaction with the corresponding search results; and
aggregate the weighted classification data of the identified first information items as the query's classification data.

26. The non-transitory computer readable storage medium of claim 25, wherein the one or more computer programs further comprise:
instructions to update the historical query information; and
instructions to repeat the identification of queries in the historical query information, the generation of classification data for the queries, and the generation of classification data for the initially unclassified information item using the updated historical query information.

27. The non-transitory computer readable storage medium of claim 25, wherein the instructions to provide customized services include instructions to:
receive a query from a user at a respective client device, wherein the user has an associated user profile;
identify a set of search results corresponding to the query, wherein one of the search results is associated with one of the second information items;
determine a score for the search result by comparing the stored classification data of the second information item with the user profile;

order the search result with respect to the other search results in accordance with the determined score; and
provide data representing at least the ordered search result to the client device.

28. The non-transitory computer readable storage medium of claim 25, wherein the instructions to provide customized services include instructions to:
identify a set of queries submitted by a user in the historical query information and the corresponding search results, wherein the search results correspond to one or more of the first and second information items;
generate a user profile for the user by aggregating the classification data of the one or more information items;
store the generated user profile in the server system; and
customize the requested service using the stored user profile in response to a request for service from the user at a client device.

29. The non-transitory computer readable storage medium of claim 28, wherein the instructions to customize the requested service include instructions to:
prepare a user-independent service in response to the service request, wherein the user-independent service includes one or more of the first and second information items;
determine a score for each of the one or more information items by comparing the information item's classification data with the stored user profile; and
re-arrange the one or more information items in the service in accordance with their respective scores.

30. The non-transitory computer readable storage medium of claim 25, wherein the historical query information comprises historical query information for queries submitted by a community of users.

31. The non-transitory computer readable storage medium of claim 25, wherein at least one of the information items is a web page.

32. The non-transitory computer readable storage medium of claim 25, wherein at least one of the information items is a website including multiple web pages.

33. The non-transitory computer readable storage medium of claim 25, further comprising:
instructions to update the classification data of the first information items based on the historical query information and the generated classification data of the initially unclassified information items.

34. The non-transitory computer readable storage medium of claim 25, wherein the instructions to provide customized services associated with the second information items include instructions to:
identify generated classification data commonly associated with a plurality of users; and
normalize the identified classification data for each respective user of the plurality of users in accordance with a level of interest demonstrated by the respective user in the identified classification data relative to other users of the plurality of users.

35. A non-transitory computer readable storage medium and one or more computer programs embedded therein, the one or more computer programs comprising instructions which, when executed by a computer system, cause the computer system to:
respectively access historical query information for queries having search results that correspond to first information items and second information items, wherein the first information items are initially classified and the second information items are initially unclassified;
access classification data of the first information items;
generate classification data for the second information items based on the classification data of the first information items and the historical query information;
store the generated classification data in the server system; and
provide customized services associated with the second information items to a plurality of client devices using the corresponding classification data stored in the server system;
wherein the instructions to generate classification data for an initially unclassified information item include instructions to:
identify a set of queries in the historical query information, wherein at least a subset of the queries each has an associated search result corresponding to the initially unclassified information item;
generate classification data for the set of queries based on the classification data of the first information items and the historical query information for the set of queries; and
generate classification data for the initially unclassified information item by combining the generated classification data of the subset of queries, each of which has an associated search result corresponding to the initially unclassified information item; and
wherein the instructions to generate classification data for the initially unclassified information item by combining the generated classification data of the subset of queries include instructions to:
for each query of the subset of queries,
weight the classification data of the query in accordance with at least one of: the initially unclassified information item's predefined information retrieval score, a search result position of a search result corresponding to the initially unclassified information item in a set of search results for the query, and user interaction with the corresponding search result; and
aggregate the weighted classification data of the subset of queries as the initially unclassified information item's classification data.

36. The non-transitory computer readable storage medium of claim 35, wherein the instructions to generate classification data for the initially unclassified information items further include instructions to:
for each query of the subset of queries, weight the classification data of the query in accordance with a number of query-terms in the query.

* * * * *

UNITED STATES PATENT AND TRADEMARK OFFICE
CERTIFICATE OF CORRECTION

PATENT NO.       : 8,185,544 B2
APPLICATION NO.  : 12/420775
DATED            : May 22, 2012
INVENTOR(S)      : Oztekin et al.

It is certified that error appears in the above-identified patent and that said Letters Patent is hereby corrected as shown below:

In the Claims:

In Column 28, line 13, Claim 25, please delete "pluralit" and add -- plurality --.

Signed and Sealed this
Tenth Day of July, 2012

David J. Kappos
*Director of the United States Patent and Trademark Office*